(12) United States Patent
Kanegae

(10) Patent No.: US 8,488,277 B2
(45) Date of Patent: Jul. 16, 2013

(54) MAGNETIC RECORDING MEDIUM AND MAGNETIC RECORDER

(75) Inventor: Yoshiharu Kanegae, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 629 days.

(21) Appl. No.: 12/687,140

(22) Filed: Jan. 14, 2010

(65) Prior Publication Data

US 2010/0177426 A1 Jul. 15, 2010

(30) Foreign Application Priority Data

Jan. 15, 2009 (JP) .................. 2009-006304

(51) Int. Cl.
*G11B 5/82* (2006.01)
*G11B 5/738* (2006.01)

(52) U.S. Cl.
USPC ........................................................ 360/135

(58) Field of Classification Search
USPC .......... 360/135, 59, 125.31, 125.74; 428/828, 428/831, 834, 835
See application file for complete search history.

(56) References Cited

U.S. PATENT DOCUMENTS

| | | | |
|---|---|---|---|
| 7,548,398 B2 * | 6/2009 | Kamimura et al. | 360/135 |
| 8,247,095 B2 * | 8/2012 | Champion et al. | 428/831 |
| 2005/0193405 A1 * | 9/2005 | Hattori et al. | 720/659 |
| 2005/0202287 A1 * | 9/2005 | Lu et al. | 428/831.2 |
| 2006/0210838 A1 * | 9/2006 | Kamimura et al. | 428/832 |
| 2008/0026255 A1 * | 1/2008 | Das et al. | 428/831.2 |
| 2012/0194942 A1 * | 8/2012 | Hohlfeld et al. | 360/59 |
| 2012/0237797 A1 * | 9/2012 | Tanaka et al. | 428/846 |

OTHER PUBLICATIONS

K. Shono et al.; Review of Thermally Assisted Magnetic Recording; Journal of the Magnetics Society of Japan; 2005; pp. 5-13; vol. 29, No. 1.

* cited by examiner

*Primary Examiner* — Will J Klimowicz
(74) *Attorney, Agent, or Firm* — Antonelli, Terry, Stout & Kraus, LLP.

(57) ABSTRACT

A magnetic recording medium for a hard disk drive, including a thermal conduction layer made of materials having different thermal conductivities formed on a recording layer having data recording regions and including magnetic particles that are heated and cooled for magnetic recording, is provided based on a thermally assisted magnetic recording technique. First thin films made of a material high in thermal conductivity are formed on portions of the thermal conduction layer, said portions located in association with portions of the data recording regions. Second thin films made of a material lower in thermal conductivity than the first thin films are formed between respective pairs of the first thin films within the thermal conduction layer. The magnetic recording medium ensures the thermal stability of the magnetic particles heated for the magnetic recording, and the thermal stability of magnetic particles located near the heated magnetic particles, thereby suppressing disappearance of data.

11 Claims, 21 Drawing Sheets

MAGNETIC RECORDING MEDIUM AND MAGNETIC RECORDER

CLAIMS OF PRIORITY

The present application claims priority from Japanese patent application serial no. JP2009-006304, filed on Jan. 15, 2009, the content of which is hereby incorporated by reference into this application.

BACKGROUND OF THE INVENTION

The present invention relates to a magnetic recording medium and a magnetic recorder. The invention more particularly relates to a magnetic recording medium and a magnetic recorder, which are suitable for information recording with a thermally assisted magnetic recording technique.

To make the capacity of a magnetic recorder such as a hard disk drive (HDD) higher and reduce the cost of the magnetic recorder, recording density of a recording medium needs to be improved. The HDD includes a recording medium having a thin magnetic film that serves as a recording layer. The HDD uses, as bit information, a magnetization state of each magnetic particle (magnetic cluster including at least one crystal grain) included in the magnetic film. In order to increase the recording density in HDDs, it is necessary to reduce the size of each of the magnetic particles. When each magnetic particle is made too small, however, the thermal stability of magnetic particles deteriorates significantly; therefore a recorded magnetization direction may become inaccurate, and recorded information may disappear. For this reason, reduction in the size of each of the magnetic particles is limited. It is believed that the size of the magnetic particles used in the existent techniques is close to the limit of size reduction.

When magnetic anisotropy energy is represented as $K_U$ and the volume of the magnetic particle is represented as V, magnetic energy of the magnetic particle is equal to $K_U$ multiplied by V. When the magnetic energy of the magnetic particle is significantly larger than thermal energy ($K_B$ multiplied by V) ($K_B$ is Boltzmann constant, and T is temperature), the thermal stability of the magnetic particle during magnetization is maintained. Hence, it can be expected that a magnetic material having magnetic anisotropy energy $K_U$ higher than a magnetic material used in a conventional technique is used for a recording layer, thereby reducing the size of each magnetic particle. In this case, the magnetic anisotropy energy is proportional to a coercive force of the magnetic particle. Thus, the intensity of a magnetic field (recording magnetic field) generated for recording by a magnetic head needs to be increased to a level higher than in the conventional technique. It is, however, believed that increase in the intensity of the recording magnetic field is approaching the limits in the state of the art, irrespective of an attempt of enhancing the intensity of the magnetic field.

To solve the problem described above, thermally assisted magnetic recording has been studied in recent years. The thermally assisted magnetic recording technique uses a phenomenon that the coercive force of a magnetic material decreases when the temperature of the magnetic material is high. To perform the thermally assisted magnetic recording, a magnetic material having high magnetic anisotropy energy is used in a magnetic recording medium. Magnetic particles contained in the magnetic material are heated by means of laser light or the like during recording. Thus, the magnetic recording can be performed even with a conventional magnetic field intensity level. The thermal stability of the magnetic particles is maintained by cooling the magnetic particles, as the magnetic material has a high coercive force. However, there are many challenges to be addressed for putting the thermally assisted magnetic recording into practical use (refer to "Review of Thermally Assisted Magnetic Recording" written by Keiji Shono and Mitsumasa Oshiki, Journal of the Magnetics Society of Japan, 2005, Vol. 29, No. 1, pp. 5-13).

An important challenge to be addressed for putting the thermally assisted magnetic recording into practical use is to effectively heat and cool magnetic particles. As long as the challenge is not solved, the temperature of the magnetic particles after heating and recording remains high and the thermal stability of the magnetic particles decreases. In addition, heat is transferred to magnetic particles located near the magnetic particles heated for recording and the thermal stability of the magnetic particles located near the magnetic particles decreases. This results in recorded information disappearing.

It is, therefore, an object of the present invention to provide a high recording density and high reliable magnetic recording medium (for HDD) into which data is recorded with a thermally assisted magnetic recording technique, and to provide a magnetic recorder having the magnetic recording medium. The magnetic recording medium has a recording layer containing magnetic particles. The magnetic particles are effectively heated and cooled for magnetic recording. The magnetic recording medium ensures thermal stability of magnetic particles heated for magnetic recording and thermal stability of magnetic particles located near the magnetic particles heated for magnetic recording so as to suppress disappearance of magnetically recorded information.

SUMMARY OF THE INVENTION

A magnetic recording medium for a hard disk drive according to the present invention is provided based on a thermally assisted magnetic recording technique. The magnetic recording medium includes a recording layer and a thermal conduction layer. The thermal conduction layer is formed on the recording layer. The thermal conduction layer is made of materials having different thermal conductivities. The recording layer has data recording regions. First thin films made of a material highest in thermal conductivity among the materials are formed on some portions of the thermal conduction layer, with the some portions being located in association with portions of the data recording regions included in the recording layer. Second thin films made of a material relatively lower in thermal conductivity than the first thin films are formed between respective pairs of the first thin films within the thermal conduction layer.

Heat is effectively transferred to the data recording regions during heating by means of laser light or the like, while heat is released from the data recording regions during the stop of the heating.

DESCRIPTION OF THE PREFERRED EMBODIMENTS

Embodiments of the present invention are described below with reference to FIGS. 1 to 33.

First Embodiment

The first embodiment of the present invention is described below with reference to FIGS. 1 to 16.

Figure 1:
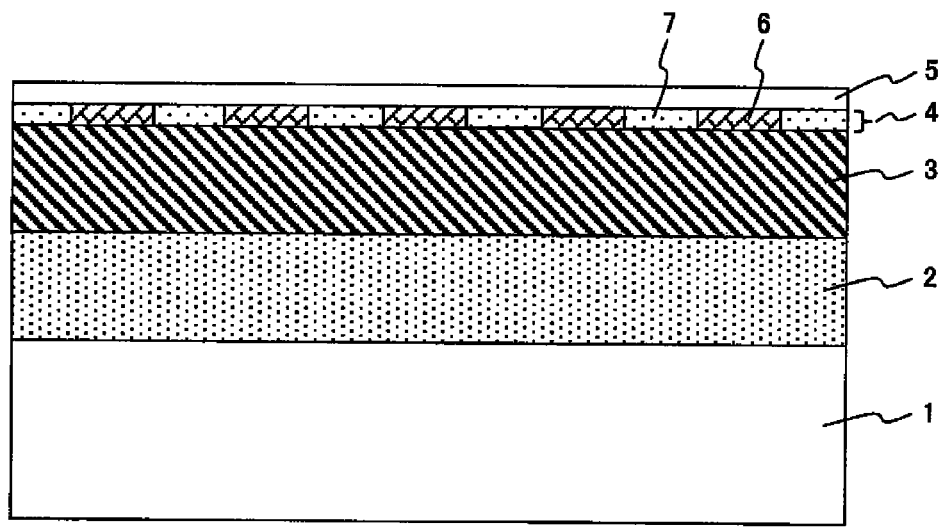
FIG. 1 is a cross sectional view of a magnetic recording medium according to a first embodiment of the present invention, taken in a radial direction of the magnetic recording medium.

FIG. 1 is a cross sectional view of a magnetic recording medium according to the first embodiment of the present invention, taken in a radial direction of the magnetic recording medium.

Figure 2:
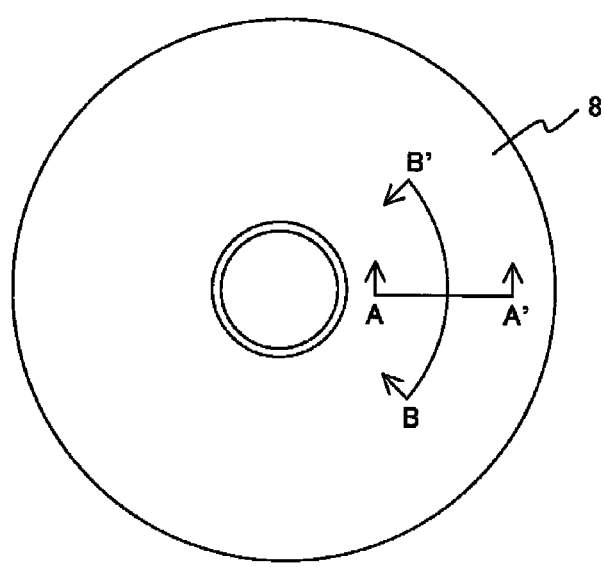
FIG. 2 is a plan view of a magnetic recording medium according to each of the embodiments of the present invention.

FIG. 2 is a plan view of a magnetic recording medium 8 according to each of the embodiments of the present invention.

Figure 3:
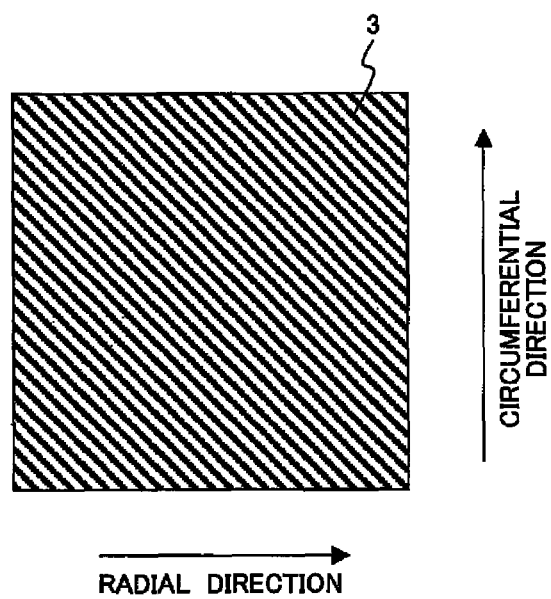
FIG. 3 is a plan view of a recording layer whose entire surface is made of a magnetic material.

FIG. 3 is a plan view of a part of a recording layer 3 whose entire surface is made of a magnetic material.

Figure 4:
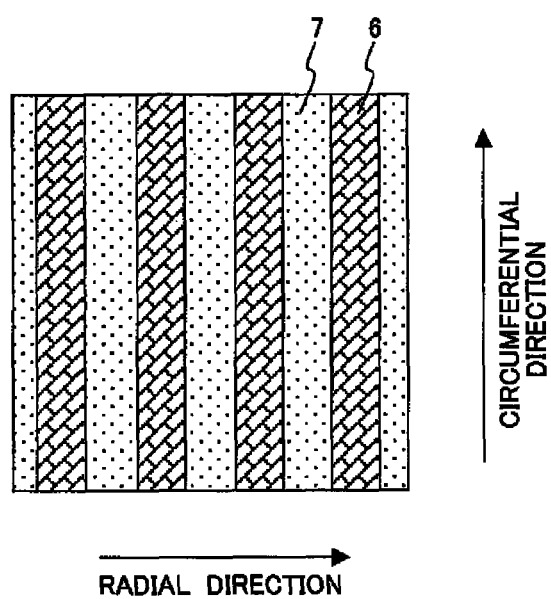
FIG. 4 is a first plan view of a thermal conduction layer included in the magnetic recording medium according to the first embodiment of the present invention.

FIG. 4 is a first plan view of a thermal conduction layer included in the magnetic recording medium according to the first embodiment of the present invention.

Figure 5:
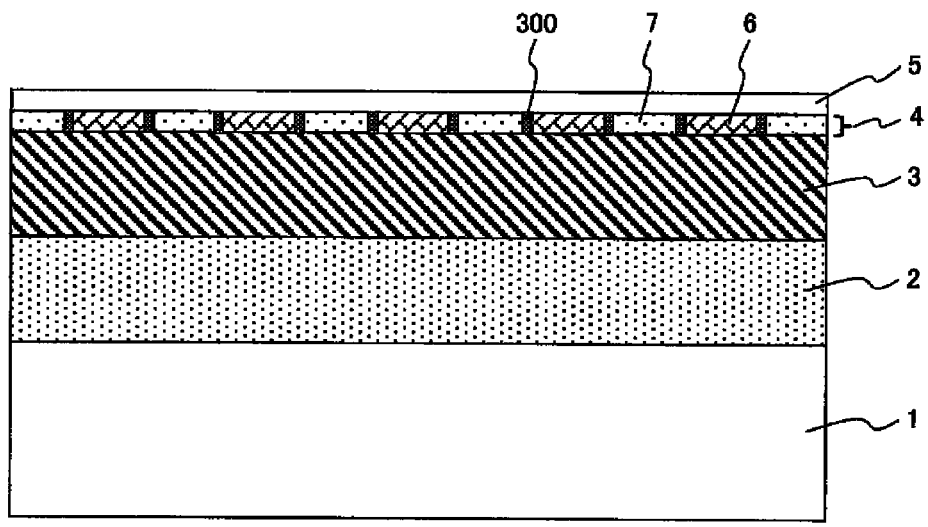
FIG. 5 is a cross sectional view of the magnetic recording medium (shown in FIG. 1) having added thereto a diffusion barrier layer located between a thin film including a material having high thermal conductivity and a thin film including a material having low thermal conductivity.

FIG. 5 is a cross sectional view of the magnetic recording medium (shown in FIG. 1) having added thereto a diffusion barrier layer 300 located between a thin film 6 including a material having high thermal conductivity and a thin film 7 including a material having low thermal conductivity.

Figure 6:
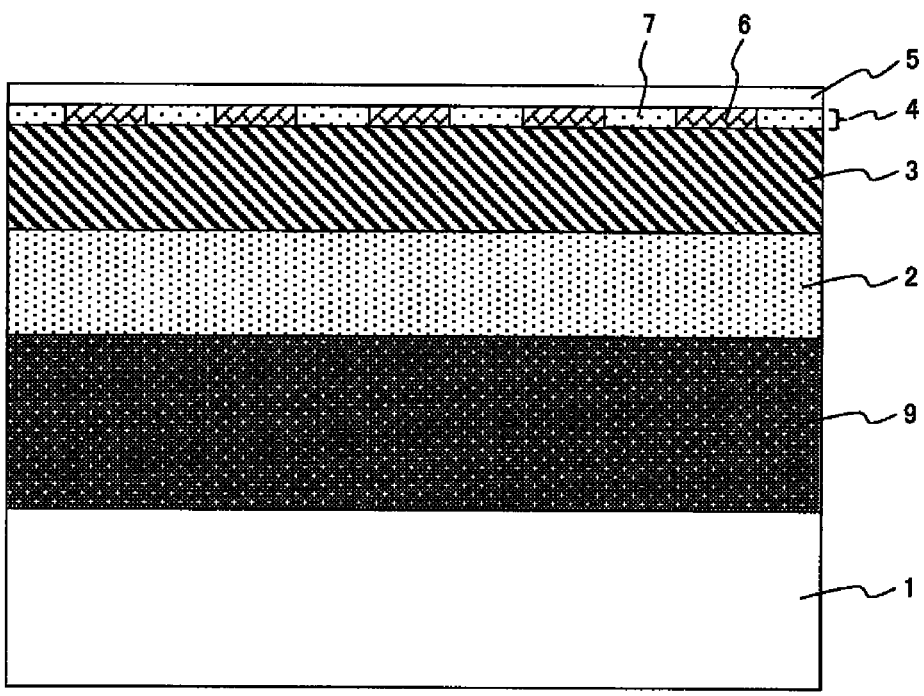
FIG. 6 is a cross sectional view of the magnetic recording medium (shown in FIG. 1) having added thereto a seed layer located between a substrate and a under layer.

FIG. 6 is a cross sectional view of the magnetic recording medium (shown in FIG. 1) having added thereto a seed layer located between a substrate 1 and a under layer 2.

Figure 7:
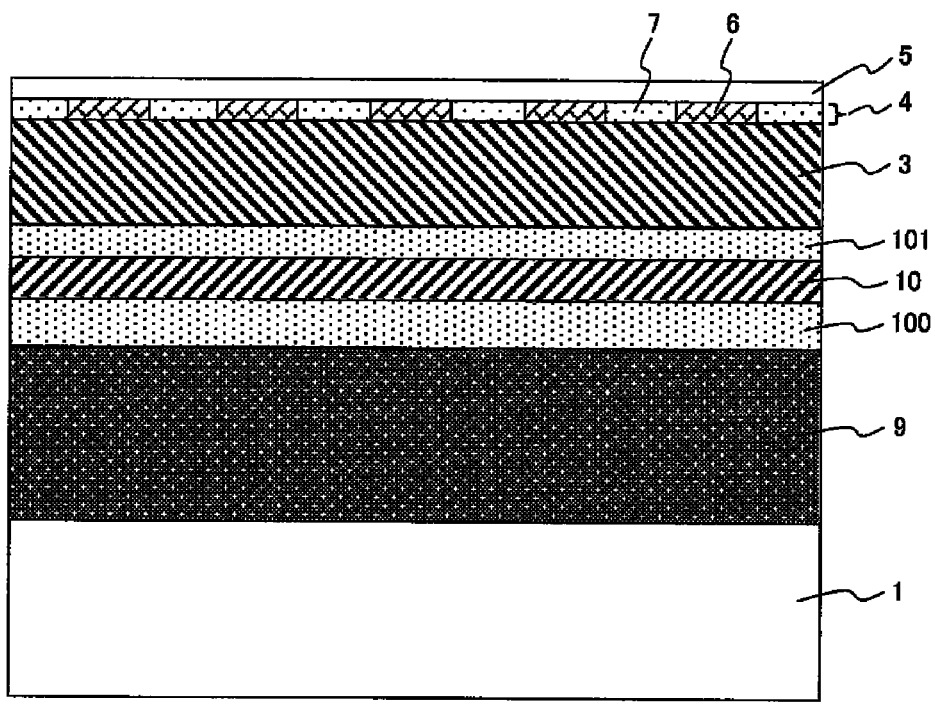
FIG. 7 is a cross sectional view of the magnetic recording medium (shown in FIG. 6) having added thereto a stabilizing layer located between a first under layer and a second under layer.

FIG. 7 is a cross sectional view of the magnetic recording medium (shown in FIG. 1) having added thereto a stabilizing layer 10 located between a first under layer 100 and a second under layer 101.

Figure 8:
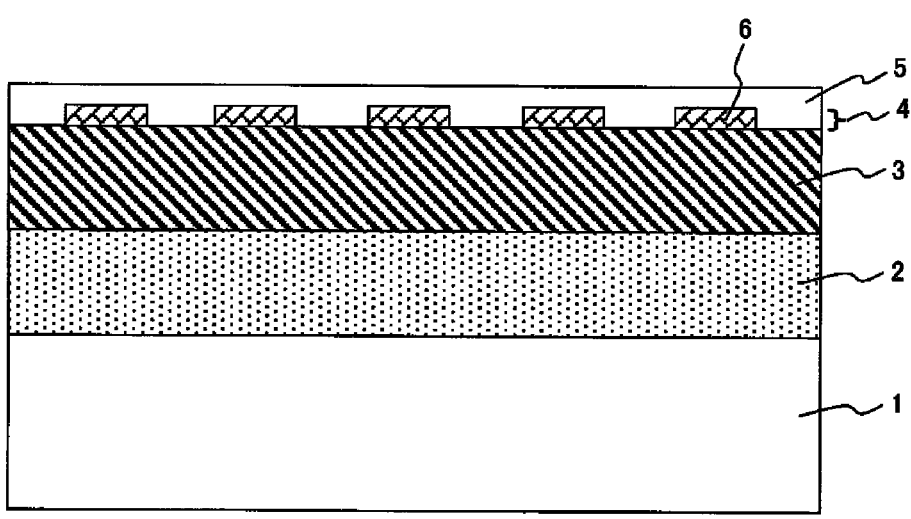
FIG. 8 is a cross sectional view of the magnetic recording medium (shown in FIG. 1) having the thin film that is located in an overcoat and includes the material having the high thermal conductivity.

FIG. 8 is a cross sectional view of the magnetic recording medium (shown in FIG. 1) having the thin film 6 that is located in an overcoat 5 and includes the material having the high thermal conductivity.

Figure 9:
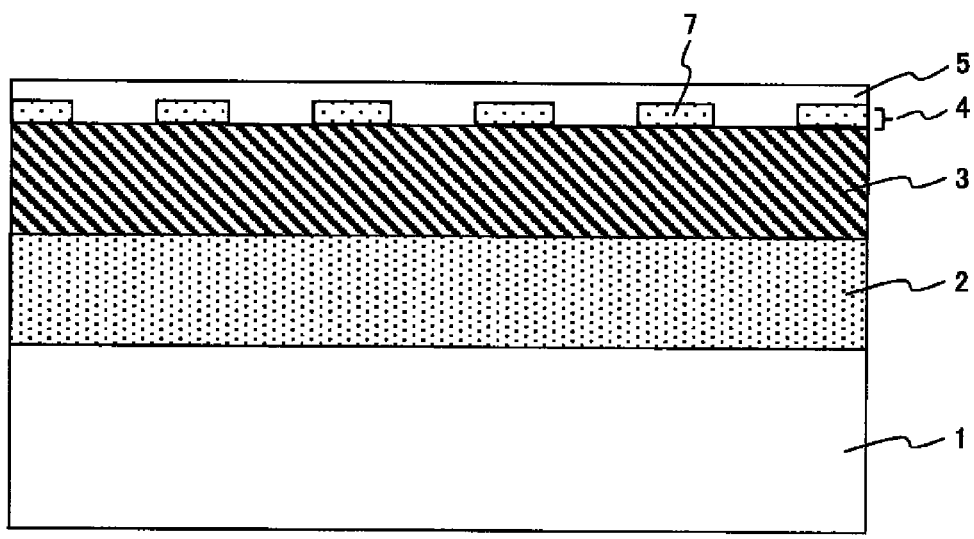
FIG. 9 is a cross sectional view of the magnetic recording medium (shown in FIG. 1) having the thin film that is located in the overcoat and includes the material having the low thermal conductivity.

FIG. 9 is a cross sectional view of the magnetic recording medium (shown in FIG. 1) having the thin film 7 that is located in the overcoat 5 and includes the material having low thermal conductivity.

Figure 10:
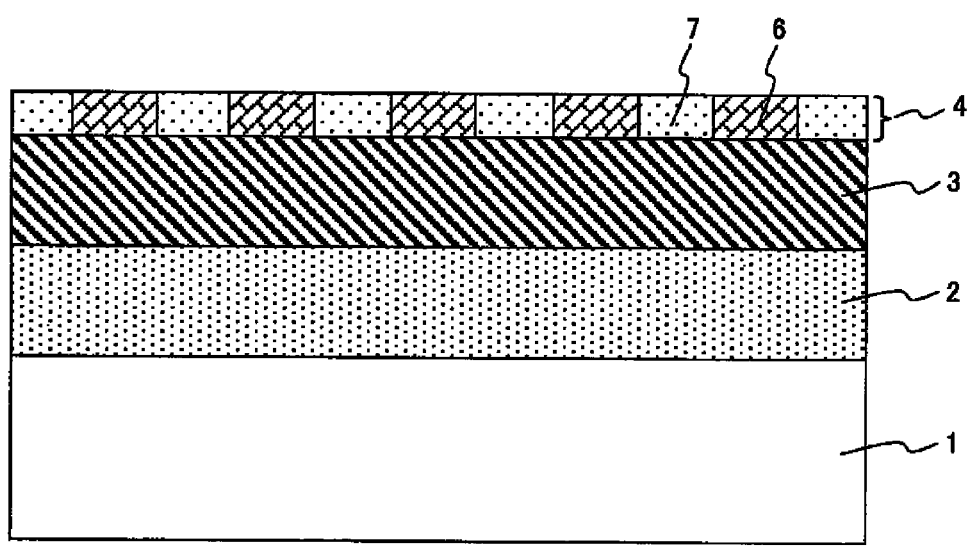
FIG. 10 is a cross sectional view of the magnetic recording medium (shown in FIG. 1) that has a thermal conduction layer having a function of the overcoat and does not include the overcoat.

FIG. 10 is a cross sectional view of the magnetic recording medium (shown in FIG. 1) that has a thermal conduction layer 4 having a function of the overcoat 5 and does not include the overcoat 5.

Figure 11:
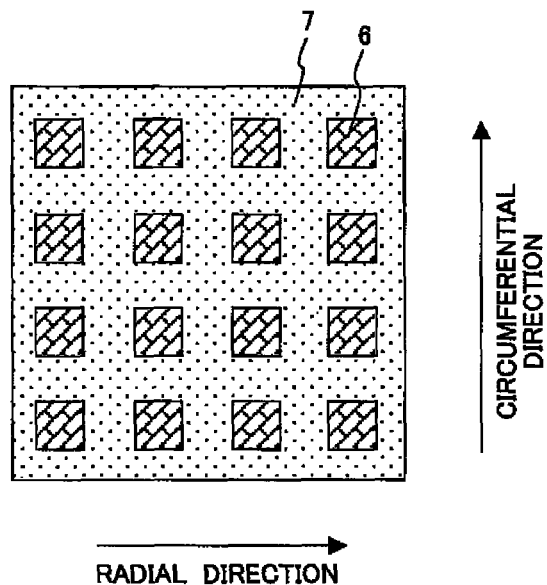
FIG. 11 is a second plan view of the thermal conduction layer included in the magnetic recording medium according to the first embodiment of the present invention.

FIG. 11 is a second plan view of the thermal conduction layer included in the magnetic recording medium according to the first embodiment of the present invention.

FIGS. 12 to 15 are cross sectional views of the magnetic recording medium according to the first embodiment of the present invention to explain processes for forming the magnetic recording medium.

Figure 16:
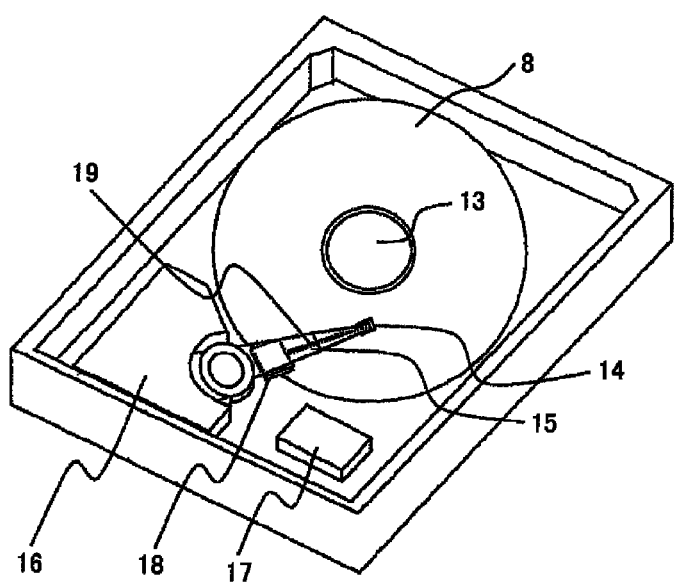
FIG. 16 is a perspective view of a magnetic recorder having the magnetic recording medium according to the first embodiment of the present invention.

FIG. 16 is a perspective view of a magnetic recorder having the magnetic recording medium according to the first embodiment of the present invention.

The magnetic recording medium according to the present embodiment has a disk-like shape. The cross sectional view of the magnetic recording medium, which is taken in the radial direction of the magnetic recording medium, is shown in FIG. 1. The cross section shown in FIG. 1 is a part of a cross section taken along a line A-A' of FIG. 2. The magnetic recording medium shown in FIG. 1 includes the substrate 1, the under layer 2, a recording layer 3, the thermal conduction layer 4, and the overcoat 5. The under layer 2 is formed on the substrate 1. The recording layer 3 is formed on the under layer 2. The thermal conduction layer 4 is formed on the recording layer 3. The overcoat 5 is formed on the thermal conduction layer 4. A lubricant (not shown) is coated on the overcoat 5.

The entire surface of the recording layer 3 is made of a magnetic material, as shown in FIG. 3.

The thermal conduction layer 4 includes a plurality of materials, as shown in FIG. 4. The materials included in the thermal conduction layer 4 have thermal conductivity that varies depending on the material. The thin film 6 is located on tracks (on which data is to be recorded) included in the recording layer 3. The thin film 7 is located on other regions of the recording layer 3. The thin film 6 includes a material having the highest thermal conductivity among the materials included in the thermal conduction layer 4. The thin film 7 includes a material having thermal conductivity lower than the material of the thin film 6. As shown in FIG. 4, the thin film 6 has portions that continuously extend along a circumferential direction of the magnetic recording medium. That is, the portions of the thin film 6 are discretely formed in the radial direction of the magnetic recording medium. In addition, the thin film 7 has portions that continuously extend along the circumferential direction of the magnetic recording medium. In order to record data, heat is effectively transferred through the thin film 6 to data recording regions included in the recording layer 3. On the other hand, when the data recording is not performed, heat is effectively released from the data recording regions. It is hardly likely that heat is transferred to the tracks other than the tracks having the heated regions due to the thin film 7. The portions of the thin film 7 are located in respective spaces between pairs of the portions of the thin film 6. This structure ensures thermal stability of magnetic particles included in the recording layer 3 during magnetic recording and suppresses disappearance of recorded data.

The substrate 1 is a glass substrate, an aluminum substrate, an aluminum alloy substrate, or the like. The recording layer 3 is made of a magnetic alloy (such as CoCrP, a granular film containing a magnetic alloy and an oxide (such as CoCrPt—$SiO_2$), or a material containing these materials and an additive element. The under layer 2 is preferably made of a material that contains Cr, W, Mo or the like and has a body-centered cubic structure. An axis of easy magnetization of magnetic atoms contained in the recording layer 3 is aligned parallel to a surface of the substrate 1. Thus, the magnetic recording medium has high longitudinal magnetic anisotropy and is a stable longitudinal magnetic recording medium. The overcoat 5 is made of a material containing a diamond-like carbon, a silicon oxide, a silicon nitride, an aluminum oxide or the like. The thin film 6 (included in the thermal conduction layer 4) is made of a material containing copper, silver, gold, aluminum, diamond, diamond-like carbon, or carbon nanotube. The thin film 7 (included in the thermal conduction layer 4) is made of a material containing a silicon oxide, a silicon nitride, a copper oxide, or an aluminum oxide. It is preferable that the material of the thin film 6 have higher thermal conductivity than the material of the recording layer 3. It is preferable that the material of the thin film 7 have lower thermal conductivity than the material of the recording layer 3. Thus, the heating and the heat releasing are effectively performed. It is preferable that the thermal conduction layer 4 have a thickness of 1 to 10 nm.

The diffusion barrier layer(s) 300 may be provided in at least one of the following regions: an interface region between the thin film 6 and the thin film 7; an interface region between the thermal conduction layer 4 and the recording layer 3; and an interface region between the thermal conduction layer 4 and the overcoat 5. The diffusion barrier(s) 300 suppress a diffusion of the materials of the thermal conduction layer 4. When the diffusion barrier layers 300 are provided in all interface regions between the portions of the thin film 6 and the portions of the thin film 7, the cross section of the magnetic recording medium taken in the radial direction of the magnetic recording medium is as shown in FIG. 5. Each of the diffusion barrier layers 300 includes a material containing a titanium nitride, a tantalum nitride, tungsten, ruthenium or the like. It is preferable that each of the diffusion barrier layers 300 have a thickness of 1 to 10 nm.

The magnetic recording medium according to the present embodiment may include the seed layer 9 as shown in FIG. 6. In this case, the seed layer 9 is formed on the substrate 1. The under layer 2 is formed on the seed layer 9. The recording layer 3 is formed on the under layer 2 as shown in FIG. 6. Compared with the magnetic recording medium not having the seed layer 9, a (100) surface of the body-centered cubic structure of the under layer 2 easily grows parallel to the surface of the substrate 1. Thus, the axis of the easy magnetization of the magnetic atoms included in the recording layer 3 is easily aligned parallel to the surface of the substrate 1.

The seed layer 9 is made of a Ni alloy or the like. Alternatively, the magnetic recording medium may include the stabilizing layer 10, the first under layer 100, and the second under layer 101 as shown in FIG. 7. In this case, the seed layer 9 is formed on the substrate 1; the first under layer 100 is formed on the seed layer 9; the stabilizing layer 10 is formed on the first under layer 100; and the second under layer 101 is formed on the stabilizing layer 10. The stabilizing layer 10 is made of a magnetic material. The second under layer 101 serves as a magnetic coupling layer. The stabilizing layer 10 and the recording layer 3 are antiferromagnetically coupled together due to magnetic moments of the layers 3 and 10. Thus, the magnetic recording medium is thermally more stable. In addition, the magnetic recording medium may have stabilizing layers and non-magnetic magnetic coupling layers, which are alternately laminated.

The magnetic recording medium according to the present embodiment may have another structure shown in FIG. 8. The overcoat 5 included in the magnetic recording medium having the structure shown in FIG. 8 includes a material (having low thermal conductivity) containing a silicon oxide, a silicon nitride, an aluminum oxide or the like and is integrated with the thin film 7 included in the thermal conduction layer 4. In addition, the magnetic recording medium according to the present embodiment may have another structure shown in FIG. 9. The overcoat 5 included in the magnetic recording medium having the structure shown in FIG. 9 includes a material containing a diamond-like carbon or the like (having high thermal conductivity) and is integrated with the thin film 6 included in the thermal conduction layer 4. Furthermore, the magnetic recording medium according to the present embodiment may have another structure shown in FIG. 10. The thin film 6 included in the magnetic recording medium having the structure shown in FIG. 10 includes a material containing a diamond-like carbon or the like to serve as the overcoat. The thin film 7 included in the magnetic recording medium having the structure shown in FIG. 10 includes a material containing a silicon oxide, a silicon nitride, an aluminum oxide or the like to serve as the overcoat. The number of processes for forming the magnetic recording medium shown in each of FIGS. 8 to 10 is smaller than the number of processes for forming the magnetic recording medium shown in FIG. 1.

The magnetic recording medium according to the present embodiment may have a structure shown in FIG. 11. The thermal conduction layer 4 has the plurality of materials. The magnetic recoding medium having the structure shown in FIG. 11 has tracks in the recording layer 3, and each of the tracks is divided into magnetic recording regions and other regions. Data is recorded in the magnetic recording regions. The magnetic recording regions may be discretely formed in the circumferential direction of the magnetic recording medium as shown in FIG. 11. The thin film 6 (that is made of one of the materials included in the thermal conduction layer 4) included in the magnetic recoding medium having the structure shown in FIG. 11 has portions that are located on the respective magnetic recording regions. The thin film 7 (that is made of another one of the materials included in the thermal conduction layer 4) included in the magnetic recoding medium having the structure shown in FIG. 11 has portions that are located on the respective other regions. As shown in FIG. 11, the portions of the thin film 6 are discretely formed in the radial direction of the magnetic recording medium and in the circumferential direction of the magnetic recording medium. In this structure shown in FIG. 11, only the magnetic recording regions of the tracks can be effectively heated. In addition, heat can be released effectively only from the magnetic recording regions. It is hardly likely that heat is transferred to the recording regions (that are located in the tracks having the heated regions) other than the heated regions due to the thin film 7. The portions of the thin film 7 are located in the respective spaces between the pairs of the portions of the thin film 6. This structure further increases the thermal stability of the magnetic particles included in the recording layer 3 during the magnetic recording.

Figure 12:
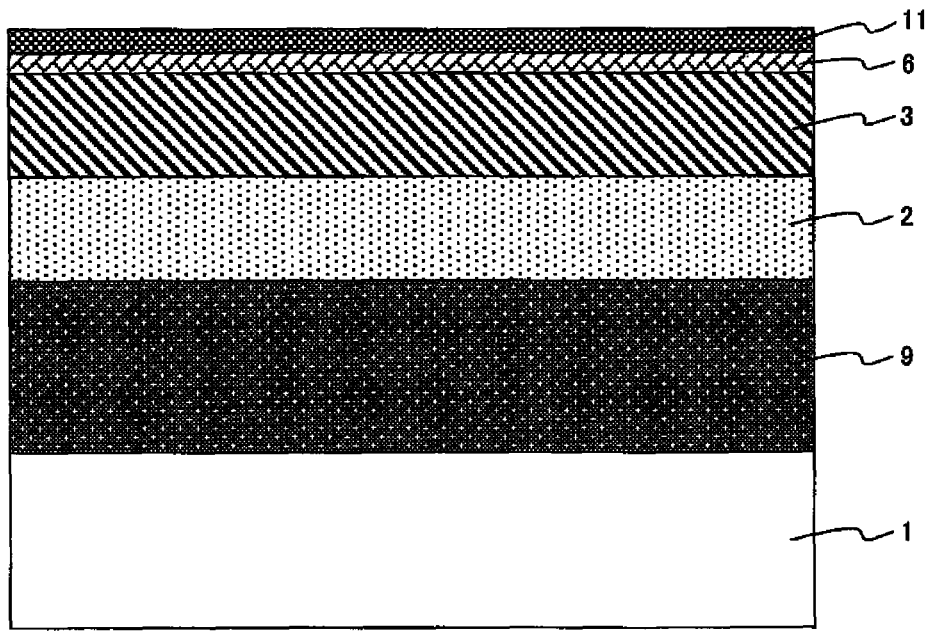
FIG. 12 is a first cross sectional view of the magnetic recording medium according to the first embodiment of the present invention to explain processes for forming the magnetic recording medium.

Next, an example of a method for forming the magnetic recording medium according to the present embodiment is described below. A method for forming the magnetic recording medium having the structure shown in FIG. 6 is described with reference to FIGS. 12 to 15. First, the seed layer 9 is formed on the substrate 1 by a plating method, a sputtering method, a chemical vapor deposition (CVD) method or the like. After that, the under layer 2 is formed on the seed layer 9 by a sputtering method, a chemical vapor deposition (CVD) method or the like. Then, the recording layer 3 is formed on the under layer 2 by a sputtering method, a chemical vapor deposition (CVD) method or the like. Chemical mechanical polishing (CMP) or the like may be performed to flatten each of the layers 2, 3 and 9. After that, the thin film 6 is formed on the recording layer 3 by a sputtering method, a CVD method or the like. Then, a photoresist 11 for patterning is coated on the thin film 6, as shown in FIG. 12.

Figure 13:
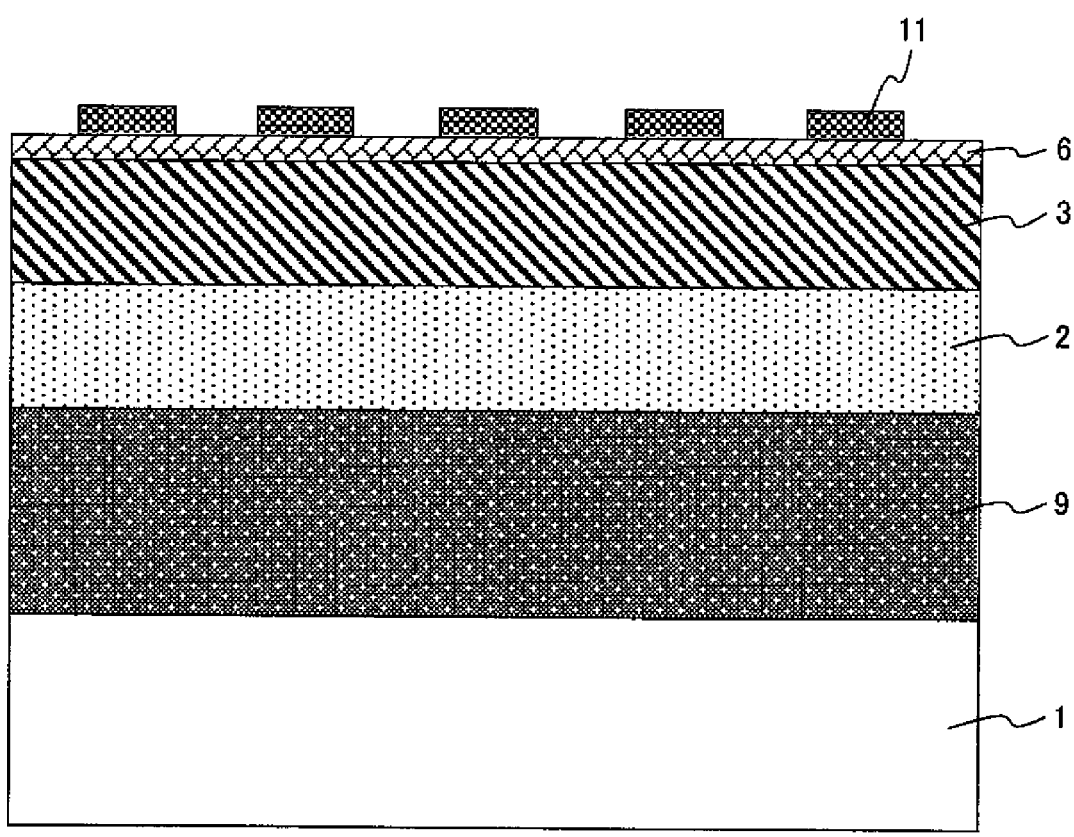
FIG. 13 is a second cross sectional view of the magnetic recording medium according to the first embodiment of the present invention to explain the processes for forming the magnetic recording medium.
Figure 14:
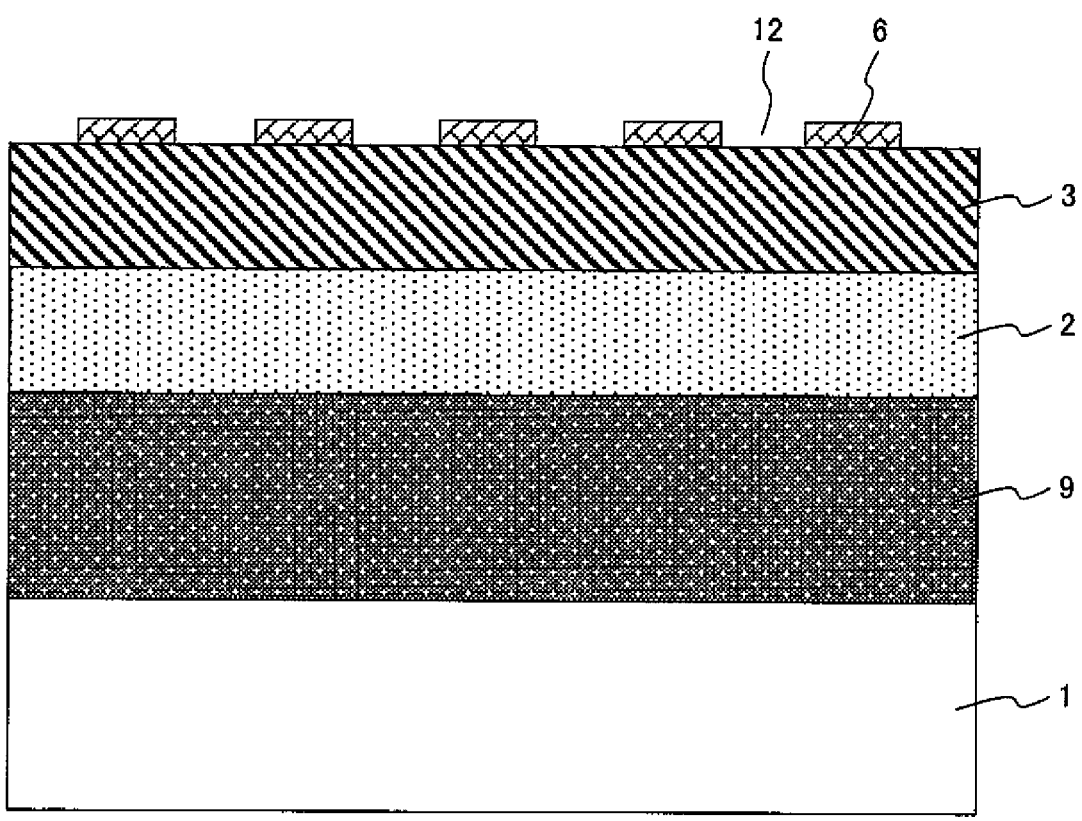
FIG. 14 is a third cross sectional view of the magnetic recording medium according to the first embodiment of the present invention to explain the processes for forming the magnetic recording medium.
Figure 15:
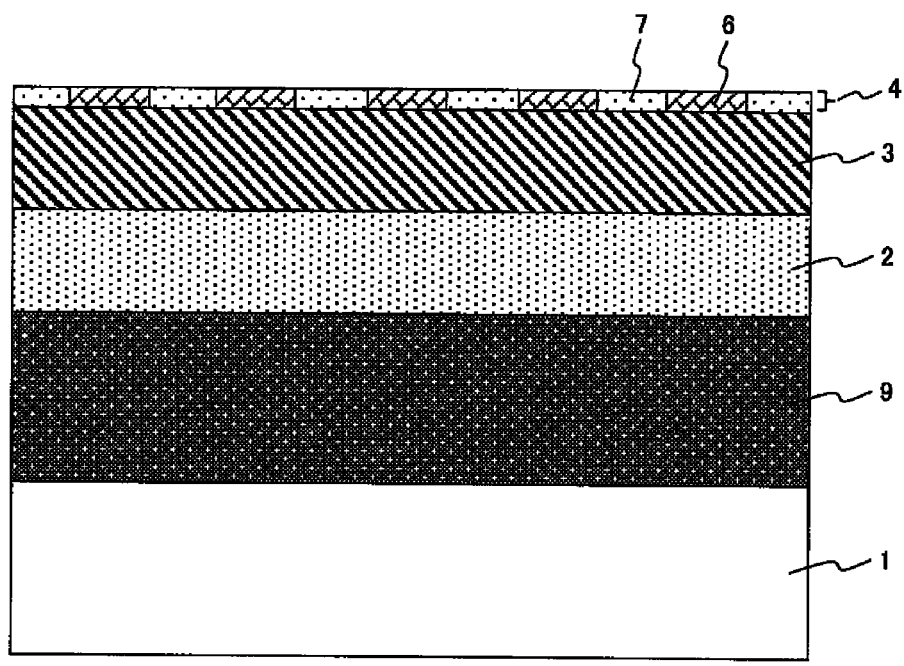
FIG. 15 is a fourth cross sectional view of the magnetic recording medium according to the first embodiment of the present invention to explain the processes for forming the magnetic recording medium.

A portion(s) of the photoresist 11 is removed by lithography and development, as shown in FIG. 13. Then, a position(s) of the thin film 6 is removed by etching. After the etching is performed, the remaining photoresist 11 is removed by means of a solution such as acetone to form a groove(s) 12 as shown in FIG. 14. Then, the thin film 7 is embedded into the groove(s) 12 by a sputtering method, a CVD method or the like. The thin film 6 and the thin film 7 are then flattened by a CMP method or the like, as shown in FIG. 15. The overcoat 5 is then formed on the thin films 6 and 7 by a sputtering method, a CVD method or the like to form the magnetic recording medium shown in FIG. 6. It should be noted that the lubricant (not shown) is coated on the overcoat 5.

The magnetic recording medium according to the present embodiment, which is suitable for thermally assisted magnetic recording, may be used in a magnetic recorder shown in FIG. 16. The magnetic recorder shown in FIG. 16 includes the magnetic recording medium 8 according to the present embodiment, a spindle 13, and a slider 14. The magnetic recorder also includes a suspension 15, a voice-coil-motor 16, a signal processing LSI 17, a semiconductor laser package 18, and a waveguide 19. The slider 14 has a magnetic head and a heating unit. The slider 14 is held by the suspension 15 and positioned above a desired track of the magnetic recording medium by the voice-coil-motor 16. The magnetic head receives a recording signal and reads a reproducing signal. The recording signal received by the magnetic head and the reproducing signal read by the magnetic head are processed by the signal processing LSI 17. The semiconductor laser package 18 is fixed to the suspension 15. Laser light generated in the semiconductor laser package 18 is transferred through the waveguide 19 to the heating unit. The heating unit then generates near-field light to heat a desired track of the magnetic recording medium.

Second Embodiment

The second embodiment of the present invention is described below with reference to FIGS. 17 to 23.

In the first embodiment, the axis of easy magnetization of the magnetic atoms included in the recording layer is aligned parallel to the surface of the substrate, and magnetization is oriented in a horizontal direction. The first embodiment describes longitudinal magnetic recording.

In the second embodiment, an axis of easy magnetization of magnetic atoms included in a recording layer is aligned perpendicular to the surface of the substrate, and magnetization is oriented in a vertical direction. The second embodiment describes perpendicular magnetic recording.

Each of FIGS. 17 to 23 shows a magnetic recording medium according to the second embodiment of the present invention, which is taken in a radial direction of the magnetic recording medium.

Figure 17:
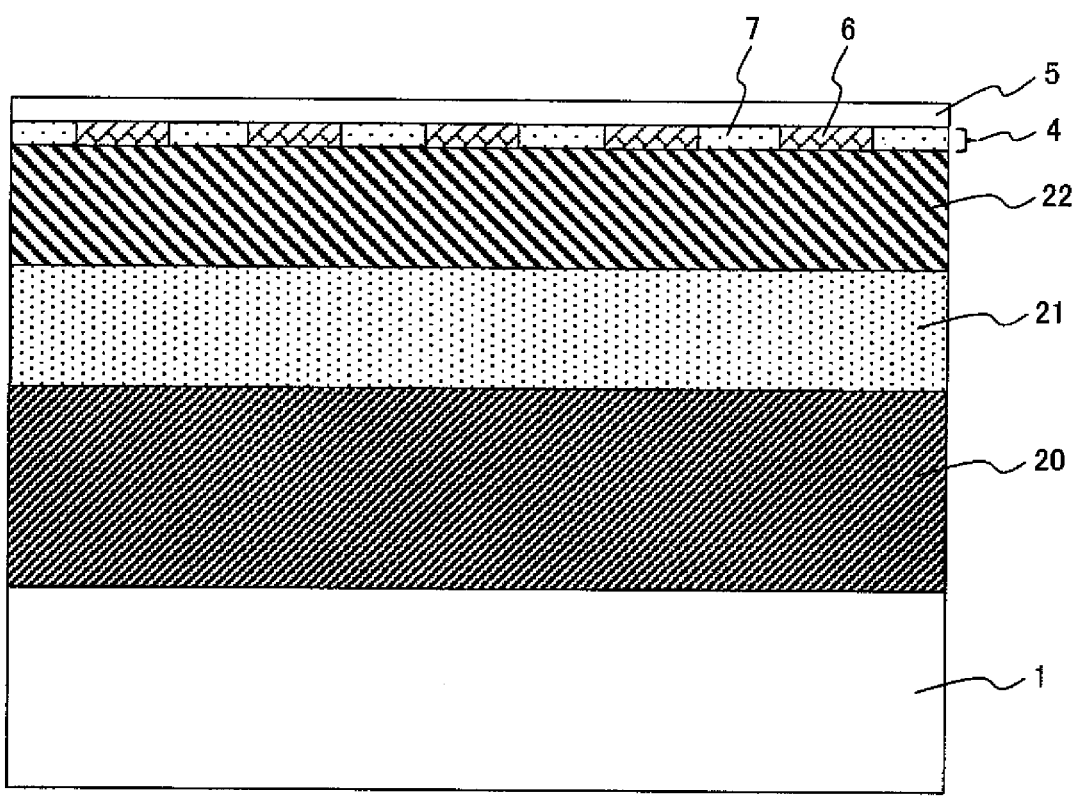
FIG. 17 is a first cross sectional view of a magnetic recording medium according to a second embodiment of the present invention, taken in a radial direction of the magnetic recording medium.

The magnetic recording medium according to the second embodiment has a disk-like shape. FIG. 17 is a cross sectional view of the magnetic recording medium taken in the radial direction of the magnetic recording medium. The cross section shown in FIG. 17 is a part of the cross section taken along the line A-A' of FIG. 2. The magnetic recording medium shown in FIG. 17 includes the substrate 1, a soft magnetic layer 20, an under layer 21, a recording layer 22, the thermal conduction layer 4, and the overcoat 5. The soft magnetic layer 20 is formed on the substrate 1. The under layer 21 is formed on the soft magnetic layer 20. The recording layer 22 is formed on the under layer 21. The thermal conduction layer 4 is formed on the recording layer 22. The overcoat 5 is formed on the thermal conduction layer 4. A lubricant (not shown) is coated on the overcoat 5.

The entire surface of the recording layer 22 is made of a magnetic material.

The thermal conduction layer 4 has the same structure as the thermal conduction layer 4 shown in FIG. 4. In order to record data, heat is effectively transferred through the thin film 6 to a data recording regions included in the recording layer 22. On the other hand, when the data recording is not performed, heat is effectively released from the data recording regions. It is hardly likely that heat is transferred to the tracks other than the tracks having the heated regions due to the thin film 7. The portions of the thin film 7 are located in the respective spaces between the pairs of the portions of the thin film 6. This structure ensures thermal stability of the magnetic particles included in the recording layer 22 during magnetic recording and suppresses disappearance of recorded data. The substrate 1 is a glass substrate, an aluminum substrate, an aluminum alloy substrate, or the like. The soft magnetic layer 20 is made of a nickel alloy (such as NiFe), a steel alloy (such as FeTaC), a cobalt alloy (such as CoTaZr) or the like. The recording layer 22 is made of a magnetic alloy (such as CoCrPt), a granular film containing a magnetic alloy and an oxide (such as $CoCrPt—SiO_2$) or a material containing these materials and an additive element. The under layer 21 preferably contains Ru, Os or Re and has a hexagonal close-packed structure. Thus, the axis of easy magnetization of the magnetic atoms included in the recording layer 22 is aligned perpendicular to the surface of the substrate 1. The magnetic recording medium according to the present embodiment has high perpendicular magnetic anisotropy and is a stable perpendicular magnetic recording medium. The overcoat 5 is made of a material containing a diamond-like carbon, a silicon oxide, a silicon nitride, an aluminum oxide or the like. It is preferable that the thermal conduction layer 4 be made of the same materials as the thermal conduction layer described in the first embodiment. Thus, the heating and the heat releasing from the recording regions after recording are effectively performed. It is preferable that the thermal conduction layer 4 have a thickness of 1 to 10 nm.

A diffusion barrier layer(s) may be provided in at least one of the following regions: an interface region between the thin film 6 and the thin film 7; an interface region between the thermal conduction layer 4 and the recording layer 22; and an interface region between the thermal conduction layer 4 and the overcoat 5. The diffusion barrier layer(s) suppresses a diffusion of the materials of the thermal conduction layer 4. The diffusion barrier layer(s) includes a material containing a titanium nitride, a tantalum nitride, tungsten, ruthenium or the like. It is preferable that the diffusion barrier layer(s) have a thickness of 1 to 10 nm.

Figure 18:
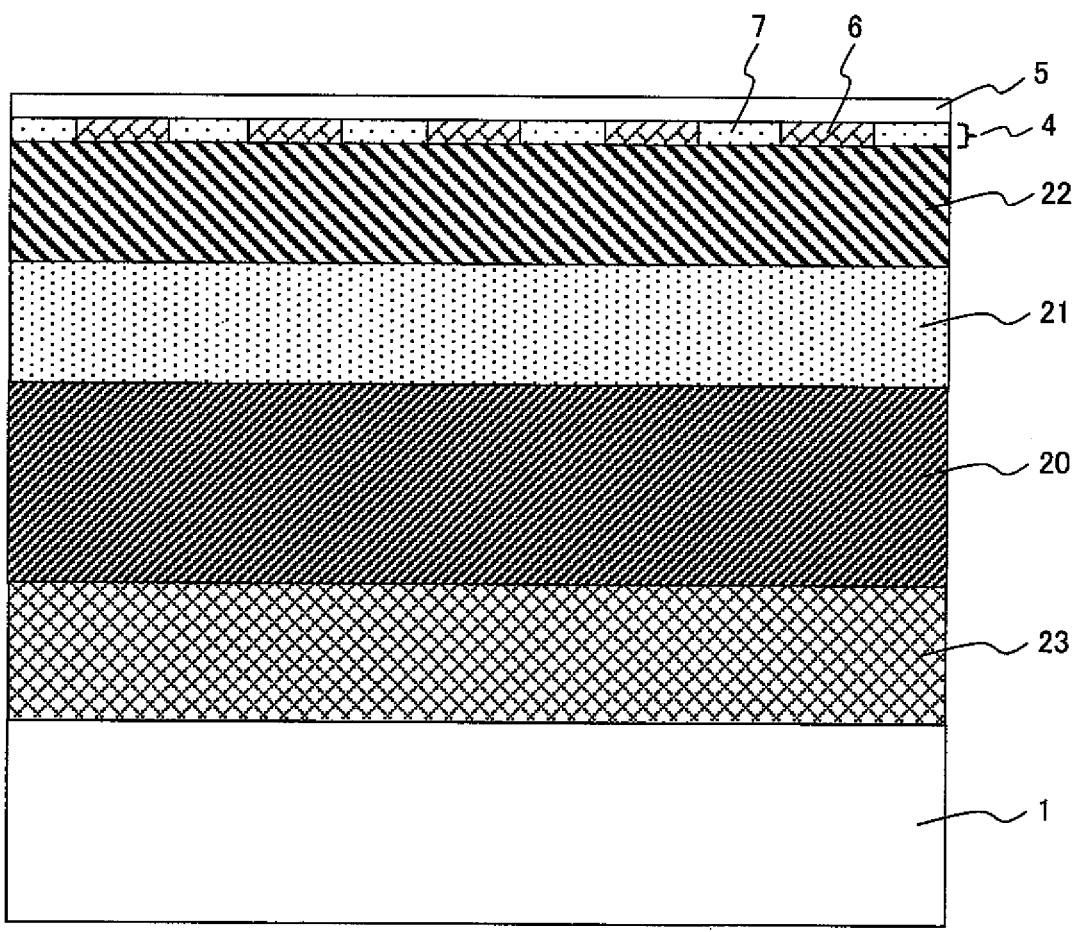
FIG. 18 is a second cross sectional view of the magnetic recording medium according to the second embodiment of the present invention, taken in the radial direction of the magnetic recording medium.

The magnetic recording medium according to the present embodiment may have another structure shown in FIG. 18. The magnetic recording medium shown in FIG. 18 has the substrate 1, a pre-coat layer 23, the soft magnetic layer 20, the under layer 21, the recording layer 22, the thermal conduction layer 4, and the overcoat 5. The pre-coat layer 23 is formed on the substrate 1. The soft magnetic layer 20 is formed on the pre-coat layer 23. The under layer 21 is formed on the soft magnetic layer 20. The recording layer 22 is formed on the under layer 21. The thermal conduction layer 4 is formed on the recording layer 22. The overcoat 5 is formed on the thermal conduction layer 4. The pre-coat layer 23 is made of an alloy containing NiTa, NiTaZr or the like when the substrate 1 is made of glass. When the substrate 1 is made of aluminum or an aluminum alloy, the pre-coat layer 23 is made of an aluminum alloy containing a composition different from that of the substrate 1, for example. In this case, adhesiveness to the substrate 1 is higher than that in the magnetic recording medium not having the pre-coat layer 23.

Figure 19:
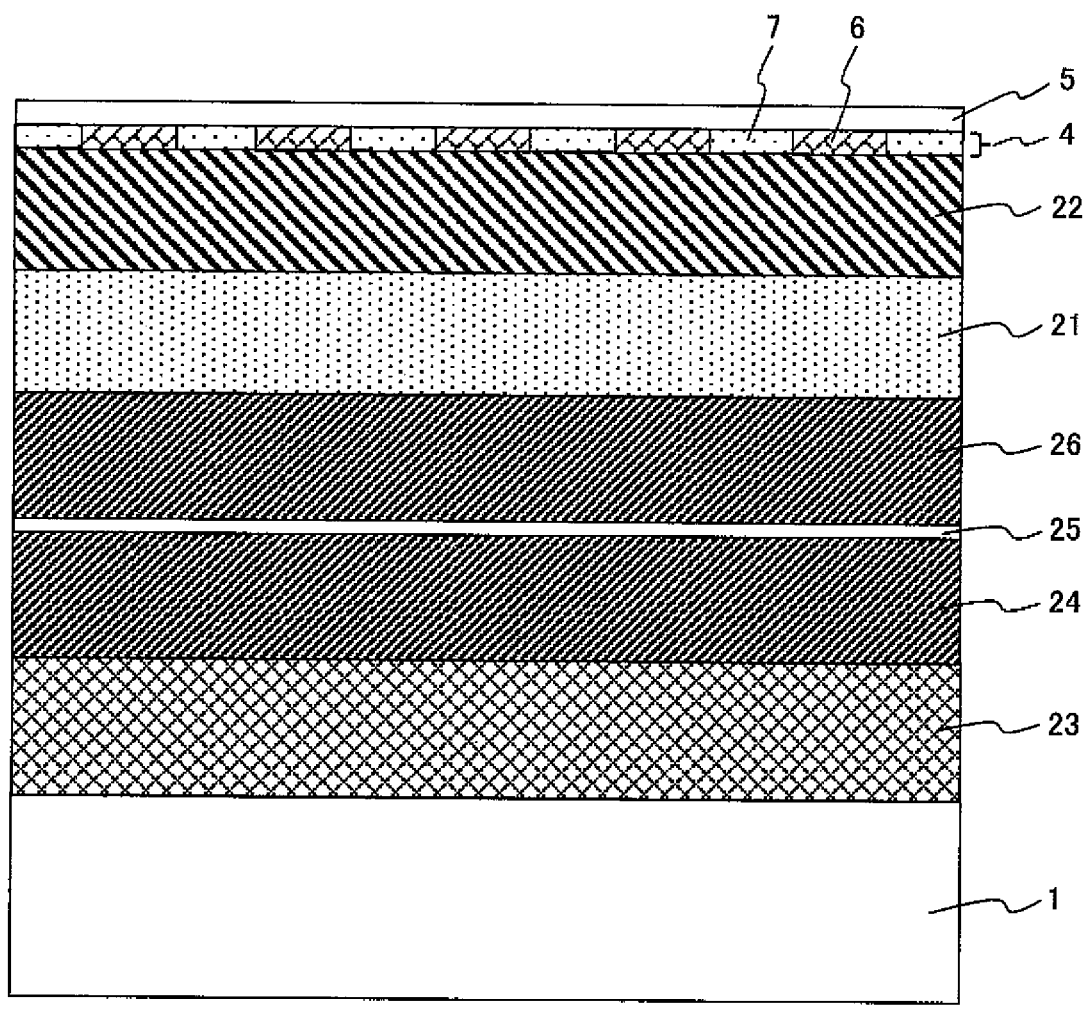
FIG. 19 is a third cross sectional view of the magnetic recording medium according to the second embodiment of the present invention, taken in the radial direction of the magnetic recording medium.

The magnetic recording medium according to the present embodiment may have another structure shown in FIG. 19. The magnetic recording medium shown in FIG. 19 has the substrate 1, the pre-coat layer 23, a first soft magnetic layer 24, a magnetic coupling layer 25, a second soft magnetic layer 26, the under layer 21, the recording layer 22, the thermal conduction layer 4 and the overcoat 5. The pre-coat layer 23 is formed on the substrate 1. The first soft magnetic layer 24 is formed on the pre-coat layer 23. The magnetic coupling layer 25 is formed on the first soft magnetic layer 24. The second soft magnetic layer 26 is formed on the magnetic coupling layer 25. The under layer 21 is formed on the second soft magnetic layer 26. The recording layer 22 is formed on the under layer 21. The thermal conduction layer 4 is formed on the recording layer 22. The overcoat 5 is formed on the thermal conduction layer 4. In this case, the first soft magnetic layer 24 and the second soft magnetic layer 26 are antiferromagnetically coupled together due to magnetic moments of the first and second soft magnetic layers 24 and 26 to reduce magnetic noise generated from the first and second soft magnetic layers 24 and 26. The magnetic coupling layer 25 includes a non-magnetic material containing Ru, Os, Re or the like. Magnetic coupling layers and soft magnetic layers may be alternately laminated on the pre-coat layer 23 included in the magnetic recording medium shown in FIG. 19 (not shown).

Figure 20:
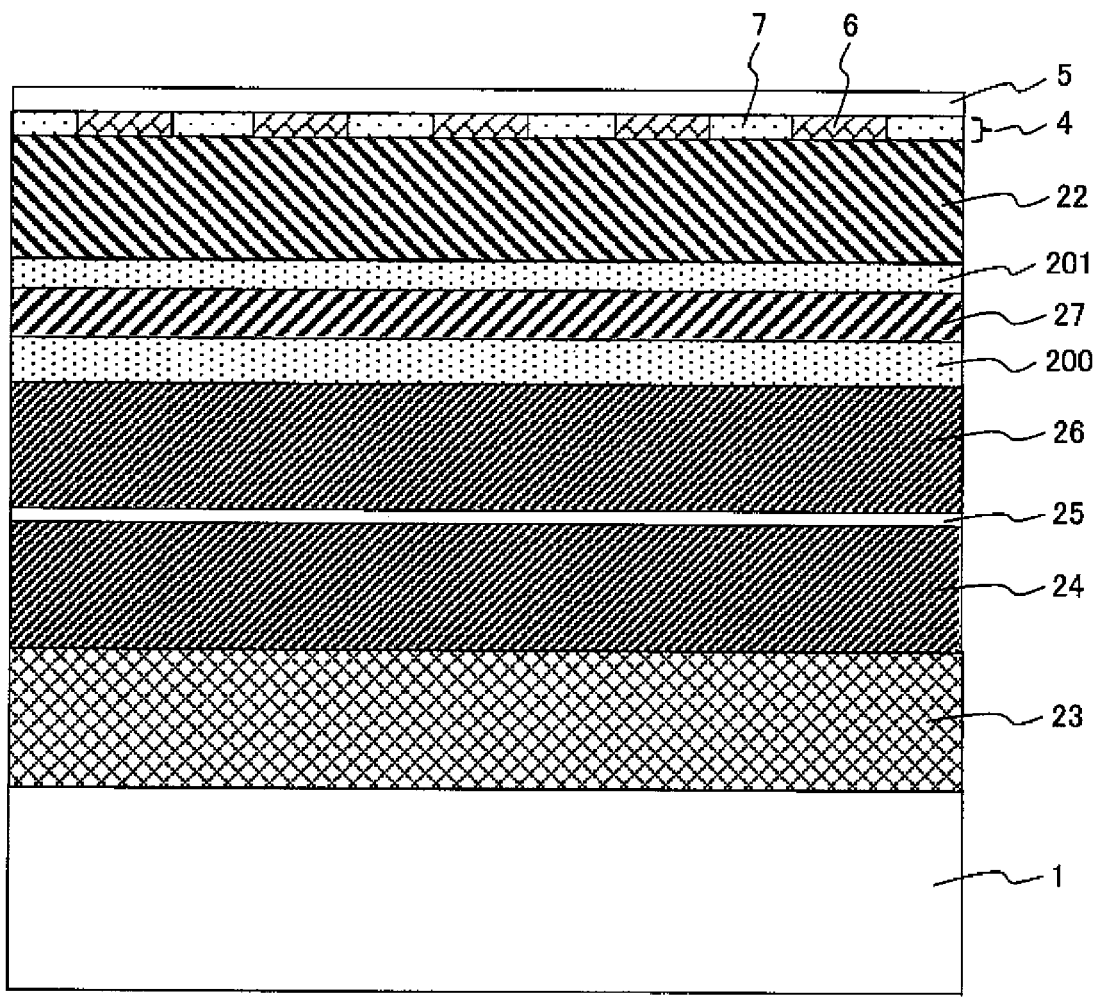
FIG. 20 is a fourth cross sectional view of the magnetic recording medium according to the second embodiment of the present invention, taken in the radial direction of the magnetic recording medium.

The magnetic recording medium according to the present embodiment may have another structure shown in FIG. 20. The magnetic recording medium shown in FIG. 20 includes the substrate 1, the pre-coat layer 23, the first soft magnetic layer 24, the magnetic coupling layer 25, the second soft magnetic layer 26, a first under layer 200, a stabilizing layer 27, a second under layer 201, the recording layer 22, the thermal conduction layer 4, and the overcoat 5. The first under layer 200 is formed on the second soft magnetic layer 26. The stabilizing layer 27 is formed on the first under layer 200. The second under layer 201 is formed on the stabilizing layer 27. The recording layer 22 is formed on the second under layer 201. The second under layer 201 serves as a magnetic coupling layer. The stabilizing layer 27 and the recording layer 22 are antiferromagnetically coupled together due to magnetic moments of the layers 22 and 27. Thus, the magnetic recording medium is thermally more stable. Stabilizing layers and non-magnetic magnetic coupling layers may be alternately laminated on the first under layer 200.

Figure 21:
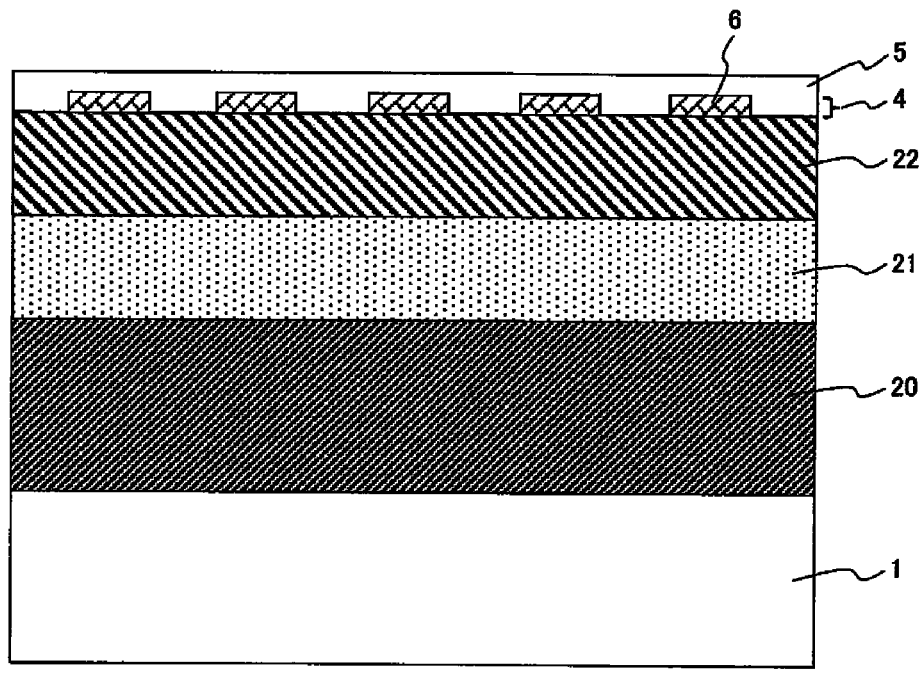
FIG. 21 is a fifth cross sectional view of the magnetic recording medium according to the second embodiment of the present invention, taken in the radial direction of the magnetic recording medium.
Figure 22:
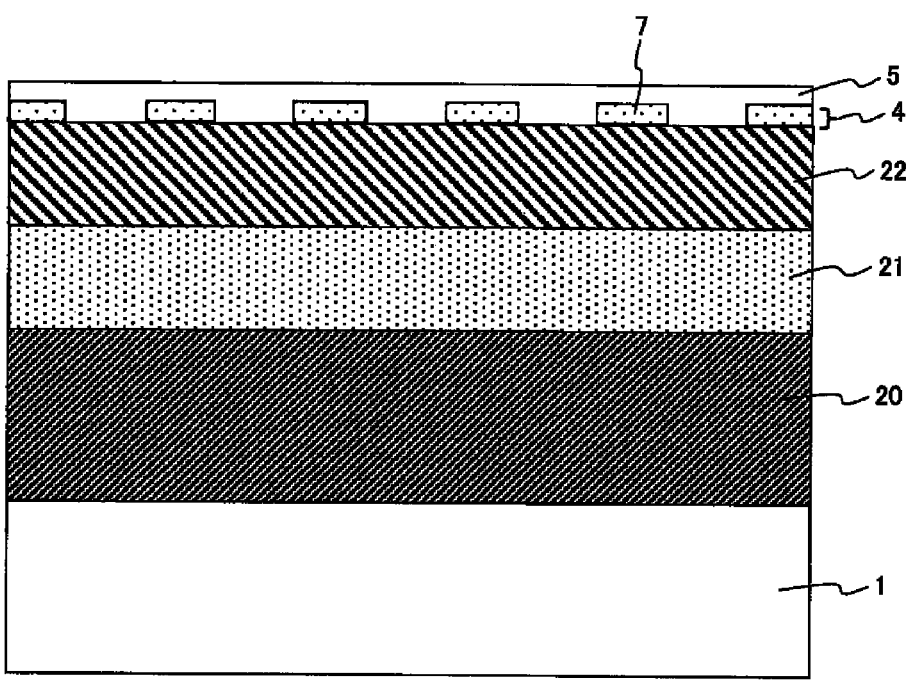
FIG. 22 is a sixth cross sectional view of the magnetic recording medium according to the second embodiment of the present invention, taken in the radial direction of the magnetic recording medium.
Figure 23:
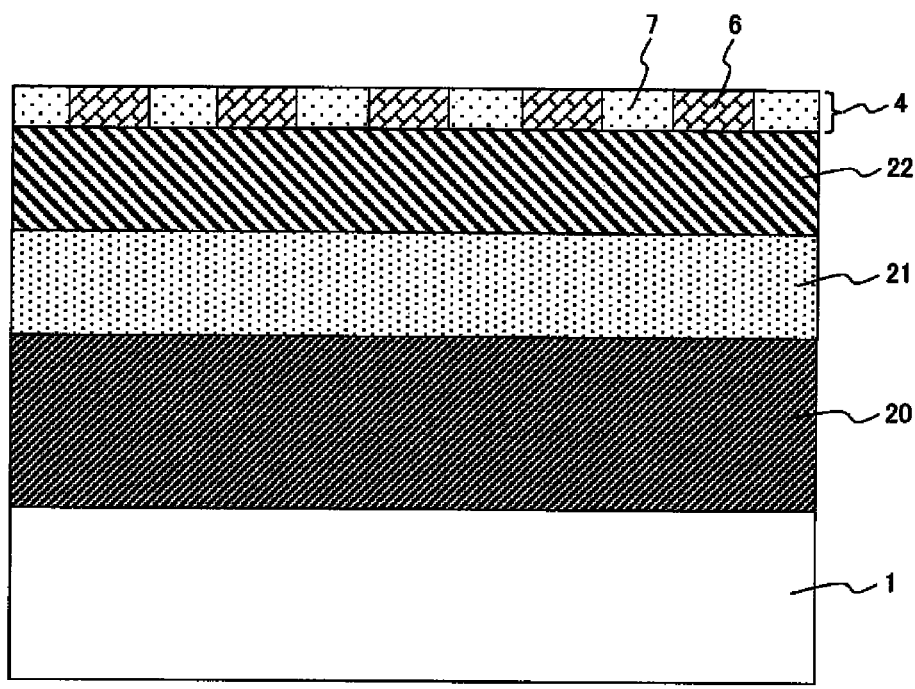
FIG. 23 is a seventh cross sectional view of the magnetic recording medium according to the second embodiment of the present invention, taken in the radial direction of the magnetic recording medium.

The magnetic recording medium according to the present embodiment may have another structure shown in FIG. 21. The magnetic recording medium shown in FIG. 21 includes the substrate 1, the soft magnetic layer 20, the under layer 21, the recording layer 22, the thermal conduction layer 4, and the overcoat 5. The overcoat 5 shown in FIG. 21 includes a material (having low thermal conductivity) containing a silicon oxide, a silicon nitride, an aluminum oxide or the like and is integrated with the thin film 7 included in the thermal conduction layer 4. The magnetic recording medium according to the present embodiment may have another structure shown in FIG. 22. The magnetic recording medium shown in FIG. 22 includes the substrate 1, the soft magnetic layer 20, the under layer 21, the recording layer 22, the thermal conduction layer 4, and the overcoat 5. The overcoat 5 shown in FIG. 22 includes a material (having high thermal conductivity) containing a diamond-like carbon or the like and is integrated with the thin film 6 included in the thermal conduction layer 4. The magnetic recording medium according to the present embodiment may have another structure shown in FIG. 23. The magnetic recording medium shown in FIG. 23 includes the substrate 1, the soft magnetic layer 20, the under layer 21, the recording layer 22, and the thermal conduction layer 4. The thin film 6 included in the thermal conduction layer 4 includes a material containing a diamond-like carbon or the like to serve as the overcoat. The thin film 7 included in the thermal conduction layer 4 includes a material containing a silicon oxide, a silicon nitride, an aluminum oxide or the like to serve as the overcoat. The number of processes for forming the magnetic recording medium shown in each of FIGS. 21 to 23 is smaller than the number of the processes for forming the magnetic recording medium shown in FIG. 17.

The magnetic recording medium according to the present embodiment may have a thermal conduction layer 4, whose structure is the same as or similar to the structure shown in FIG. 11. The thermal conduction layer 4 includes the plurality of materials. The magnetic recoding medium having the structure has tracks in the recording layer 22, and each of the tracks is divided into magnetic recording regions and other regions. Data is recorded in the magnetic recording regions. The magnetic recording regions may be discretely formed in the circumferential direction of the magnetic recording medium. The thin film 6 (that is made of one of the materials included in the thermal conduction layer 4) has portions that are located on the respective magnetic recording regions. The thin film 7 (that is made of another one of the materials included in the thermal conduction layer 4) has portions that are located on the respective other regions. In this case, heat is transferred effectively only to the magnetic recording regions and released only from the magnetic recording regions effectively. It is hardly likely that heat is transferred to the recording regions (that are located in the tracks having the heated regions) other than the heated regions due to the thin film 7 having the portions that are located in the respective spaces between the pairs of the portions of the thin film 6. This structure further increases the thermal stability of the magnetic particles included in the recording layer during the magnetic recording.

The magnetic recording medium according to the present embodiment can be formed by a similar method to the formation method described in the first embodiment. The magnetic recording medium according to the present embodiment can be used in the magnetic recorder shown in FIG. 16.

Third Embodiment

The third embodiment of the present invention is described below with reference to FIGS. 24 to 26.

Figure 24:
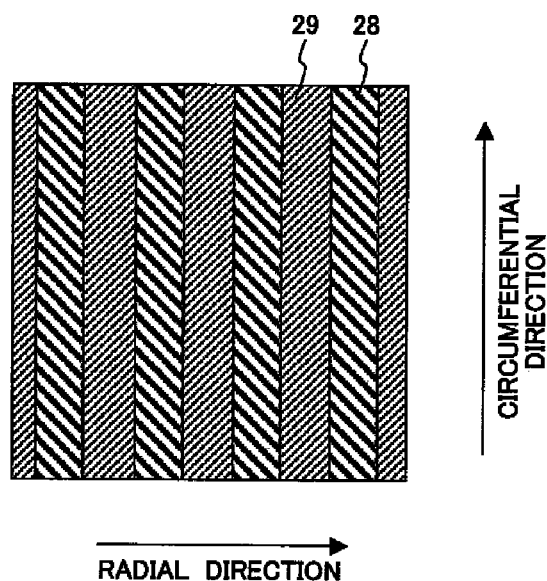
FIG. 24 is a plan view of a recording layer included in a discrete track medium (magnetic recording medium according to a third embodiment of the present invention).

FIG. 24 is a plan view of a part of a recording layer included in a discrete track medium (magnetic recording medium according to the third embodiment of the present invention).

Figure 25:
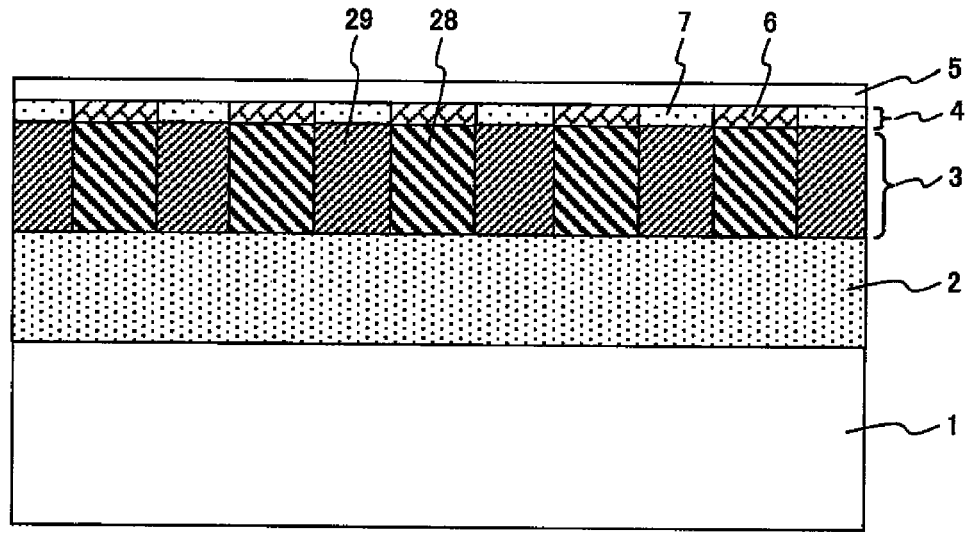
FIG. 25 is a first cross sectional view of the magnetic recording medium according to the third embodiment of the present invention, taken in a radial direction of the magnetic recording medium.
Figure 26:
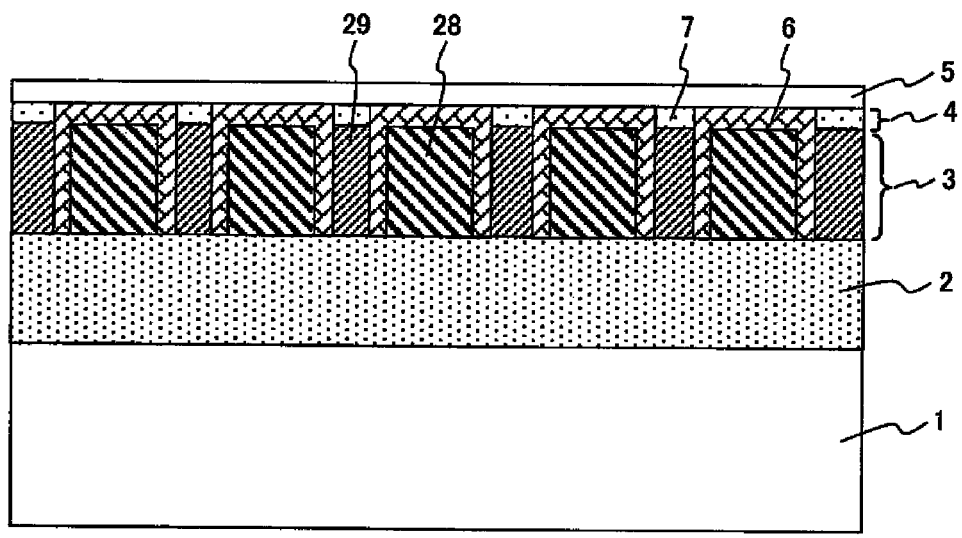
FIG. 26 is a second cross sectional view of the magnetic recording medium according to the third embodiment of the present invention, taken in the radial direction of the magnetic recording medium.

Each of FIGS. 25 and 26 is a cross sectional view of the magnetic recording medium according to the third embodiment of the present invention, taken in a radial direction of the magnetic recording medium.

In the first embodiment, data is recorded in the magnetic recording medium by the longitudinal magnetic recording, and the entire surface of the recording layer 3 is made of the magnetic material.

In the third embodiment, data is recorded in the magnetic recording medium by longitudinal magnetic recording. The magnetic recording medium according to the third embodiment includes a recording layer 3 having a magnetic material and a non-magnetic material. The magnetic material is used for recording tracks. The non-magnetic material is used for regions other than the recording tracks. The magnetic recording medium is so-called a discrete track medium.

The structure of the discrete track medium is described below with reference to FIG. 24.

The discrete track medium has the recording tracks 28 and the other regions 29 in the recording layer 3. The recording tracks 28 are made of the magnetic material. The other regions 29 are made of the non-magnetic material. The regions 29 are located in respective spaces between pairs of the recording tracks 28. The discrete track medium has a disk-like shape. The recording tracks included in the discrete track medium are magnetically separated from each other to reduce a magnetic effect and thermal fluctuation between adjacent recoding tracks. It can be expected that the discrete track medium has a high recording density.

The magnetic recording medium according to the present embodiment has a disk-like shape. FIG. 25 is a cross section of the magnetic recording medium according to the present embodiment taken in the radial direction of the magnetic recording medium. The cross section shown in FIG. 25 is apart of the cross section taken along the line A-A' of FIG. 2. The recording layer 3 included in the magnetic recording medium according to the third embodiment is different from the recording layer 3 included in the magnetic recording medium (shown in FIG. 1) according to the first embodiment. The other configurations of the magnetic recording medium according to the third embodiment are the same as those of the magnetic recording medium according to the first embodiment. The recording layer 3 included in the magnetic recording medium according to the third embodiment includes the recording tracks 28 and the other regions 29. The recording tracks 28 are made of the magnetic material. The other regions 29 are made of the non-magnetic material. The recording tracks 28 and the regions 29 continuously extend along a circumferential direction of the magnetic recording medium to form a discrete track structure. The recording tracks are magnetically separated from each other to reduce a magnetic effect (noise) generated by magnetization in a track adjacent to a track into which data is to be recorded. The recording tracks 28 are made of the same material as the recording layer 3 described in the first embodiment. The other regions 29 are preferably made of a material that is the same as or similar to the under layer 2 to simplify a formation process and suppress delamination between the layers. Alternatively, the other regions 29 are preferably made of a material that is the same as or similar to the thin film 7.

The magnetic recording medium according to the present embodiment may have another structure shown in FIG. 26. The magnetic recording medium shown in FIG. 26 has a thin film 6 that is different from the thin film 6 shown in FIG. 25. The thin film 6 included in the magnetic recording medium shown in FIG. 26 has portions that are located on top and side surfaces of the respective recording tracks 28. In this case, heat is more effectively transferred to and released from the recording tracks 28 than the heat transfer to the recording tracks 28 shown in FIG. 25.

The recording layer 3 included in the magnetic recording medium according to the third embodiment is different from the recording layer 3 included in the magnetic recording medium (shown in FIGS. 5 to 10) according to the first embodiment. The other configurations of the magnetic recording medium according to the third embodiment are the same as those of the magnetic recording medium according to the first embodiment. The recording layer 3 may have the structure shown in FIG. 25 or have the structure shown in FIG. 26.

The magnetic recording medium according to the present embodiment may have a thermal conduction layer 4, whose structure is the same as or similar to the structure shown in FIG. 11. The thermal conduction layer 4 includes the plurality of materials. The magnetic recording medium having the structure has the recording tracks 28 in the recording layer 3, and each of the recording tracks 28 is divided into the recording regions and the other regions. In this case, the portions of the thin film 6 (that is made of one of the materials included in the thermal conduction layer 4) are formed on the respective recording regions. The portions of the thin film 7 are formed on the respective other regions. Alternatively, the portions of the thin film 6 may be formed on the top and side surfaces of the respective recording regions. In this case, heat is transferred only to the recording regions effectively and released only from the recording regions effectively. It is hardly likely that heat is transferred to the recording regions (that are located in the tracks having the heated regions) other than the heated regions due to the thin film 7. The portions of the thin film 7 are located in the respective spaces between the pairs of the portions of the thin film 6. This structure further increases the thermal stability of magnetic particles included in the recording layer during the magnetic recording.

The magnetic recording medium according to the present embodiment can be formed by a similar method to the formation method described in the first embodiment. The magnetic recording medium according to the present embodiment can be used in the magnetic recorder shown in FIG. 16.

Fourth Embodiment

The fourth embodiment of the present invention is described below with reference to FIGS. 27 and 28.

Figure 27:
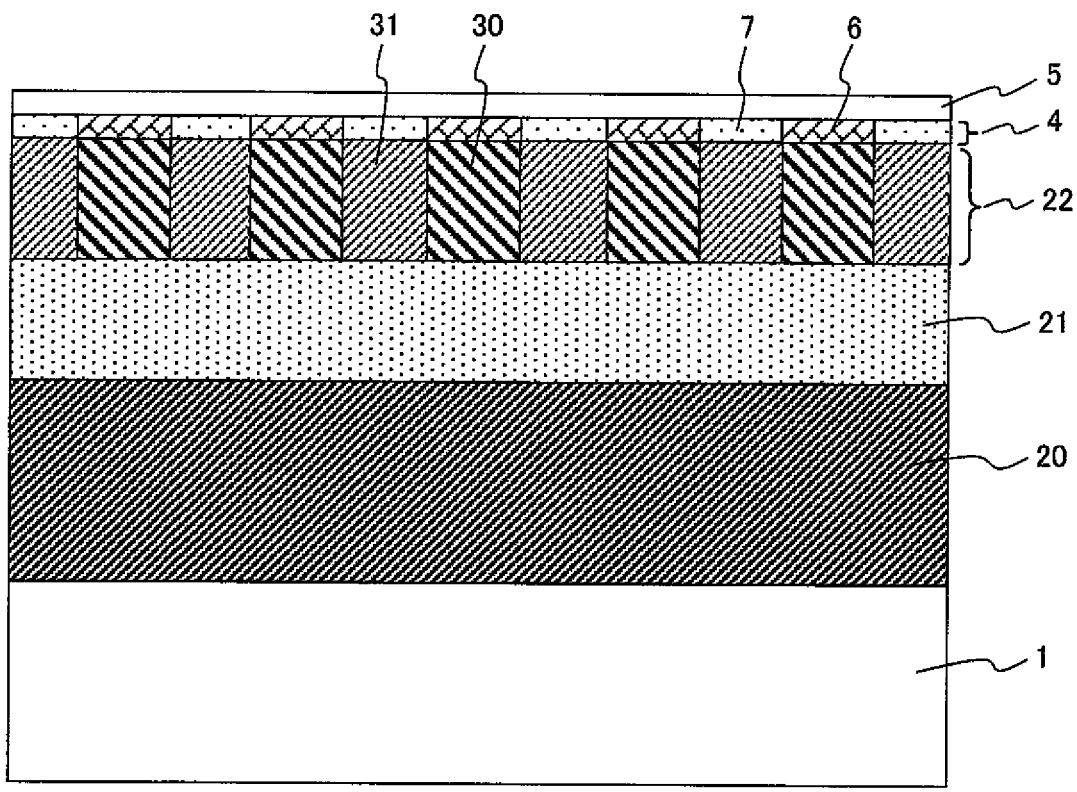
FIG. 27 is a first cross sectional view of a magnetic recording medium according to a fourth embodiment of the present invention, taken in a radial direction of the magnetic recording medium.
Figure 28:
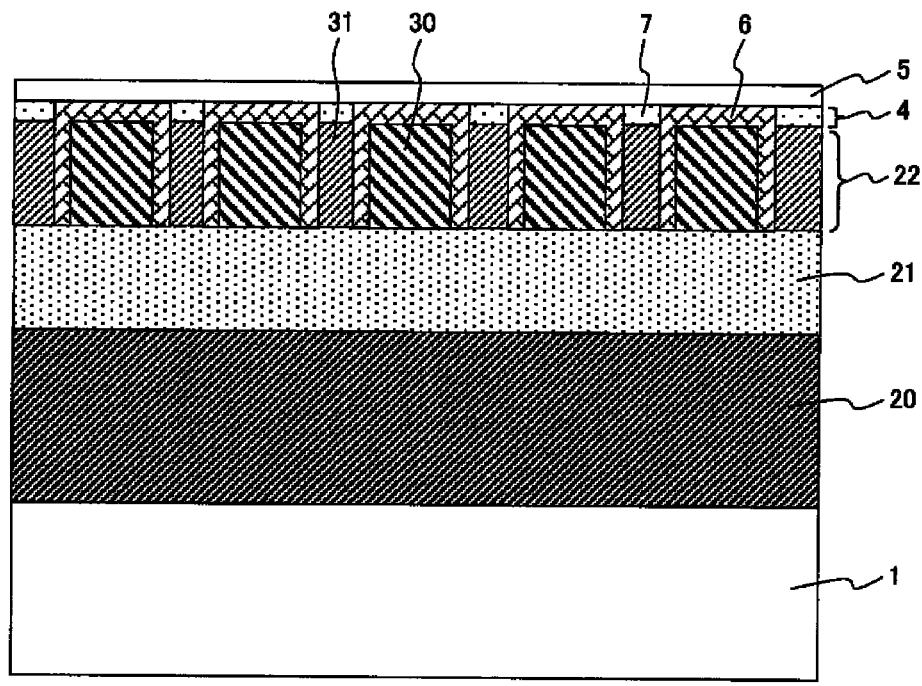
FIG. 28 is a second cross sectional view of the magnetic recording medium according to the fourth embodiment of the present invention, taken in the radial direction of the magnetic recording medium.

Each of FIGS. 27 and 28 shows a magnetic recording medium according to the fourth embodiment of the present invention, taken in a radial direction of the magnetic recording medium.

In the second embodiment, data is recorded in the magnetic recording medium by the perpendicular magnetic recording, and the entire surface of the recording layer 22 is made of the magnetic material.

In the fourth embodiment, data is recorded in the magnetic recording medium by perpendicular magnetic recording. The magnetic recording medium according to the fourth embodiment has a recording layer 22 that includes recording tracks and other regions. The recording tracks are made of a magnetic material. The other regions are made of a non-magnetic material. The magnetic recording medium according to the fourth embodiment is so-called a discrete track medium.

The magnetic recording medium according to the present embodiment has a disk-like shape. FIG. 27 shows a cross section of the magnetic recording medium taken in the radial direction of the magnetic recording medium. The cross section of the magnetic recording medium shown in FIG. 27 is a part of the cross section taken along the line A-A' of FIG. 2. The recording layer 22 included in the magnetic recording medium according to the fourth embodiment is different from the recording layer 22 included in the magnetic recording medium (shown in FIG. 17) according to the second embodiment. The other configurations of the magnetic recording medium according to the fourth embodiment are the same as those of the magnetic recording medium (shown in FIG. 17) according to the second embodiment. The recording tracks included in the recording layer 22 are denoted by reference numeral 30 as shown in FIG. 27. The other regions included in the recording layer 22 are denoted by reference numeral 31 as shown in FIG. 27. The recording tracks 30 are made of the magnetic material. The other regions 31 are made of the non-magnetic material. The recording tracks 30 and the other regions 31 continuously extend along a circumferential direction of the magnetic recording medium to form a discrete track structure. In this case, the recording tracks 30 are magnetically separated from each other to reduce a magnetic effect (noise) generated by magnetization in a track adjacent to a track into which data is to be recorded. The recording tracks 30 are made of the same material as the recording layer 22. The regions 31 are preferably made of a material that is the same as or similar to the under layer 21 to simplify a formation process and suppress delamination between the layers. Alternatively, the regions 31 are preferably made of a material that is the same as or similar to the thin film 7.

The magnetic recording medium according to the present embodiment may have another structure shown in FIG. 28. The magnetic recording medium shown in FIG. 28 has a thin film 6 that is different from the thin film 6 shown in FIG. 27. The thin film 6 included in the magnetic recording medium shown in FIG. 28 has portions that are formed on top and side surfaces of the respective recording tracks 30. In this case, heat is more effectively transferred to and released from the recording tracks 30 than heat transfer to the recording tracks 30 shown in FIG. 27.

The recording layer 22 included in the magnetic recording medium according to the fourth embodiment is different from the recording layer 22 included in the magnetic recording medium (shown in FIGS. 18 to 23) according to the second embodiment. The other configurations of the magnetic recording medium according to the fourth embodiment are the same as those of the magnetic recording medium (shown in FIGS. 18 to 23) according to the second embodiment. The recording layer 22 may have the structure shown in FIG. 27 or have the structure shown in FIG. 28.

The magnetic recording medium according to the present embodiment may have a thermal conduction layer 4, whose structure is the same as or similar to the structure shown in FIG. 11. The thermal conduction layer 4 includes the plurality of materials. The magnetic recording medium having the structure has the recording tracks 30 in the recording layer 22, and each of the recording tracks 30 is divided into recording regions and other regions. The portions of the thin film 6 (that is made of one of the materials included in the thermal conduction layer 4) are formed on the respective magnetic recording regions. The portions of the thin film 7 (that is made of another one of the materials included in the thermal conduction layer 4) are formed on the respective other regions. Alternatively, the portions of the thin film 6 may be formed on the top and side surfaces of the respective magnetic recording regions. In this case, heat is transferred only to the magnetic recording regions effectively and released only from the magnetic recording regions effectively. It is hardly likely that heat is transferred to recording regions (that are located in the tracks having the heated regions) other than the heated regions due to the thin film 7. The portions of the thin film 7 are located in the respective spaces between the pairs of the portions of the thin film 6. This structure further increases the thermal stability of magnetic particles included in the recording layer during the magnetic recording.

The magnetic recording medium according to the present embodiment can be formed by a similar method to the formation method described in the first embodiment. The magnetic recording medium according to the present embodiment can be used in the magnetic recorder shown in FIG. 16.

Fifth Embodiment

The fifth embodiment of the present invention is described below with reference to FIGS. 29 to 31.

Figure 29:
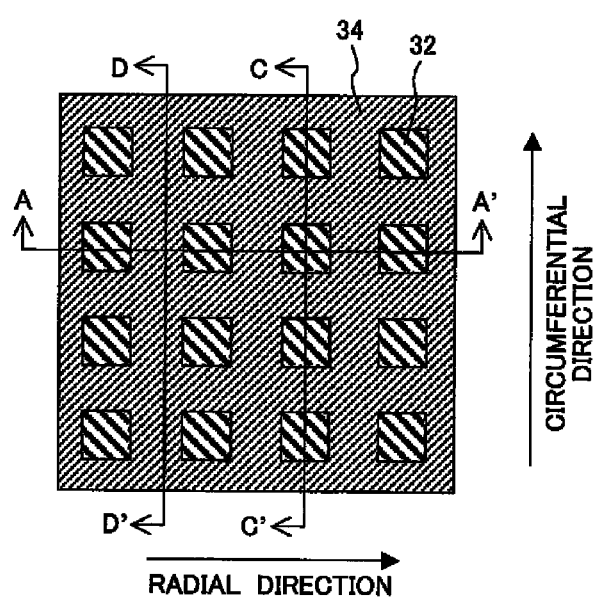
FIG. 29 is a plan view of a recording layer included in a patterned medium.

FIG. 29 is a plan view of a part of a recording layer included in a patterned medium.

Figure 30:
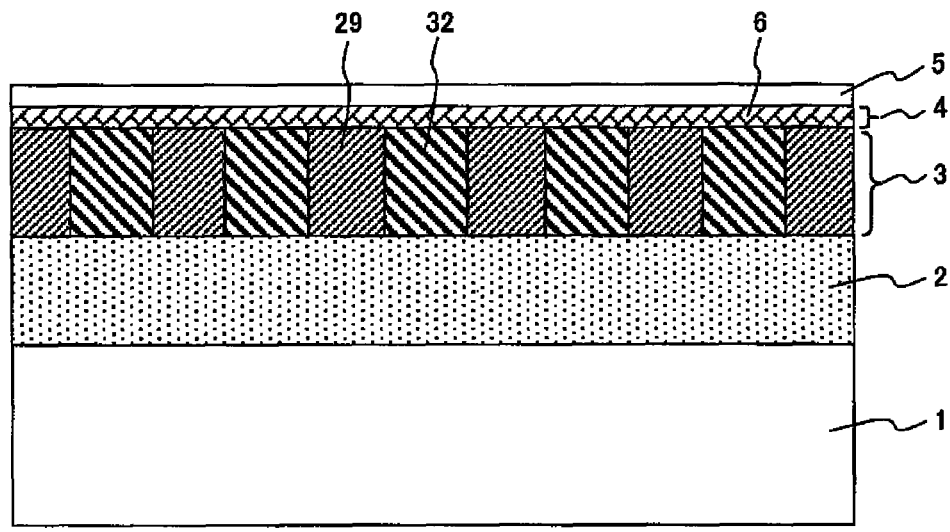
FIG. 30 is a first cross sectional view of a magnetic recording medium according to a fifth embodiment of the present invention, taken in a circumferential direction of the magnetic recording medium.
Figure 31:
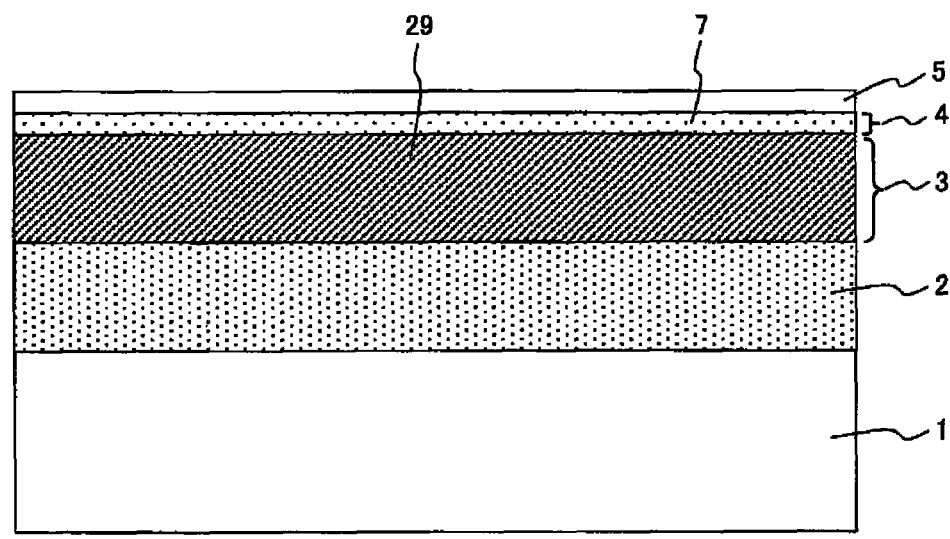
FIG. 31 is a second cross sectional view of the magnetic recording medium according to the fifth embodiment of the present invention, taken in the circumferential direction of the magnetic recording medium.

Each of FIGS. 30 and 31 is a cross sectional view of a magnetic recording medium according to the fifth embodiment of the present invention, taken in a circumferential direction of the magnetic recording medium.

In the third embodiment, data is recorded in the magnetic recording medium by the longitudinal magnetic recording; and the magnetic recording medium is a discrete track medium and includes the recording layer. The recording layer has the recording tracks made of the magnetic material and the other regions made of the non-magnetic material.

In the fifth embodiment, data is recorded in the magnetic recording medium by the longitudinal magnetic recording; and the magnetic recording medium includes a recording layer 3 having recording regions and other regions. The recording regions included in the recording layer 3 are made of a magnetic material. The other regions included in the recording layer 3 are made of a non-magnetic material. The magnetic recording medium according to the fifth embodiment is so-called a patterned medium.

The structure of the patterned medium is described below with reference to FIG. 29.

The patterned medium has a disk-like shape and includes the magnetic material and the non-magnetic material in the recording layer 3. The recording regions made of the magnetic material are discretely formed in the recording layer 3. The other regions are made of the non-magnetic material. A method for forming the patterned medium is complicated. However, the patterned medium can further reduce a magnetic effect and thermal fluctuation (that occur in a recording region located near a recording region into which data is to be recorded), compared with the discrete track medium. It can be expected that the patterned medium has a high recording density.

The recording layer 3 included in the magnetic recording medium according to the fifth embodiment is different from the recording layer 3 included in the magnetic recording medium (shown in FIG. 25) according to the third embodiment. The other configurations of the magnetic recording medium according to the fifth embodiment are the same as the magnetic recording medium (shown in FIG. 25) according to the third embodiment. The recording layer 3 of the magnetic recording medium according to the fifth embodiment has a cross section (taken along a line A-A' of FIG. 29) that is the same as or similar to the cross section of the recording layer of the magnetic recording medium shown in FIG. 25. The line A-A' of FIG. 29 is parallel to the radial direction of the magnetic recording medium according to the fifth embodiment. The recording layer 3 included in the magnetic recording medium according to the fifth embodiment has the recording regions 32. The cross section taken along the line A-A' of FIG. 29 includes the recording regions 32. FIG. 30 shows a cross section of the magnetic recording medium according to the present embodiment, taken along a line C-C' of FIG. 29. FIG. 31 shows another cross section of the magnetic recording medium according to the present embodiment, taken along a line D-D' of FIG. 29. The cross section taken along the line C-C' of FIG. 29 includes the recording regions 32 that are discretely formed in the circumferential direction of the magnetic recording medium. The cross section taken along the line D-D' of FIG. 29 does not include a recording region. The magnetic recording medium according to the present embodiment has a patterned medium structure. The recording regions 32 included in each of the tracks are magnetically separated from the recording regions 32 included in the other tracks. In addition, each of the recording regions 32, which is included in any of the tracks, is magnetically separated from another one of the recording regions 32, which is included in the same track. Thus, the patterned medium can further reduce a magnetic effect (noise) generated by magnetization in a recording region located near a recording region into which data is to be recorded, compared with the discrete track medium. Also, the patterned medium is suitable for a high recording density.

The magnetic recording medium according to the present embodiment may have another structure. The magnetic recording medium having the other structure has the following cross sections: a radial cross section (taken along the line A-A' of FIG. 29) that is the same as or similar to the cross section shown in FIG. 26; the same circumferential cross section (taken along a line on which the recording regions are located) as shown in FIG. 30; and the same circumferential cross section (taken along a line on which the recording regions are not located and a non-magnetic layer 29 is located) as shown in FIG. 31. In this case, portions of the thin film 6 are formed on top and side surfaces of the respective recording regions 32.

The magnetic recording medium according to the present embodiment may have a thermal conduction layer 4, whose structure is the same as or similar to the structure shown in FIG. 11. The thermal conduction layer 4 includes the plurality of materials. The magnetic recording medium having the structure is configured so that the thin film 6 (that is made of one of the materials included in the thermal conduction layer 4) is formed on the recording regions 32 included in the recording layer 3 and that the thin film 7 (that is made of another one of the materials included in the thermal conduction layer 4) is formed on the other regions included in the recording layer 3. In this case, the recording layer 3 has the following cross sections: a cross section (taken along the line A-A' (on which the recording regions are located) of FIG. 29) that is the same as or similar to the cross section shown in FIG. 25; a cross section (taken along the circumferential direction of the magnetic recording medium and along a line on which the recording regions are located) that is the same as or similar to the structure shown in FIG. 25 and in which the recoding regions are discretely formed and the portions of the thin film 6 are discretely formed; and the same cross section (taken along the circumferential direction of the magnetic recording medium and along a line on which the recording regions are not located) as shown in FIG. 31. The magnetic recording medium having the structure includes the recording regions that are discretely formed in the radial and circumferential directions of the magnetic recording medium according to the present embodiment. In addition, the portions of the thin film 6 are discretely formed in the radial and circumferential directions of the magnetic recording medium according to the present embodiment. Heat is effectively transferred only to and released only from the recording regions 32. It is hardly likely that heat is transferred to the recording regions other than the heated recording regions due to the thin film 7. The portions of the thin film 7 are located in the respective spaces between the pairs of the thin film 6. This structure ensures thermal stability of magnetic particles included in the recording layer during magnetic recording.

The magnetic recording medium according to the present embodiment may have another structure. The magnetic recording medium having the other structure has the following cross sections: a cross section (taken along the line A-A' (on which the recording regions are located) of FIG. 29) that is the same as or similar to the cross section shown in FIG. 26; a cross section (taken along the circumferential direction of the magnetic recording medium and along a track having recording regions) that is the same as or similar to the cross section shown in FIG. 26; and the same cross section (taken along the circumferential direction of the magnetic recording medium and along a track having the non-magnetic layer 29 without a recording region) as shown in FIG. 31. The top surface and side surfaces of each of the recording regions are in contact with the thin film 6. That is, each of the recording regions is covered with the thin film 6. In this case, heat is more effectively transferred to and released from the recording regions.

The recording layer 3 included in the magnetic recording medium according to the fifth embodiment is different from the recording layer 3 (shown in FIGS. 5 to 10) included in the magnetic recording medium according to the first embodiment. The other configurations of the magnetic recording medium according to the fifth embodiment are the same as the magnetic recording medium (shown in FIGS. 5 to 10) according to the first embodiment. The recording layer 3 included in the magnetic recording medium according to the fifth embodiment may have a structure with the following cross sections: a cross section (taken along the line A-A' of FIG. 29) that is the same as or similar to the cross section shown in FIG. 25 or 26; a cross section (taken along the circumferential direction of the magnetic recording medium and along a track having the recording regions) that is the same as or similar to the cross section shown in FIG. 30, 25 or 26; and the same cross section (taken along the circumferential direction of the magnetic recording medium and along a track not having a recording region) as shown in FIG. 31.

The magnetic recording medium according to the present embodiment can be formed by a similar method to the formation method described in the first embodiment. The magnetic recording medium according to the present embodiment can be used in the magnetic recorder shown in FIG. 16.

Sixth Embodiment

The sixth embodiment of the present invention is described below with reference to FIGS. 32 and 33.

Figure 32:
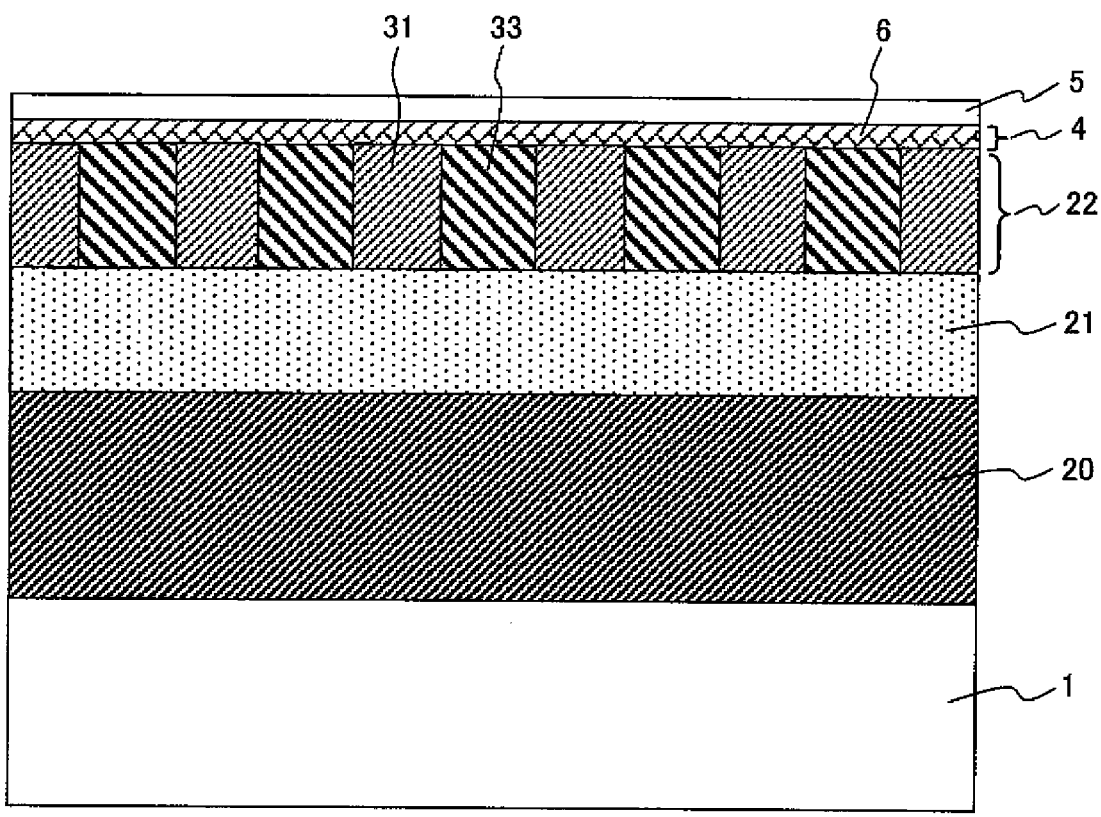
FIG. 32 is a first cross sectional view of a magnetic recording medium according to a sixth embodiment of the present invention, taken in a circumferential direction of the magnetic recording medium.
Figure 33:
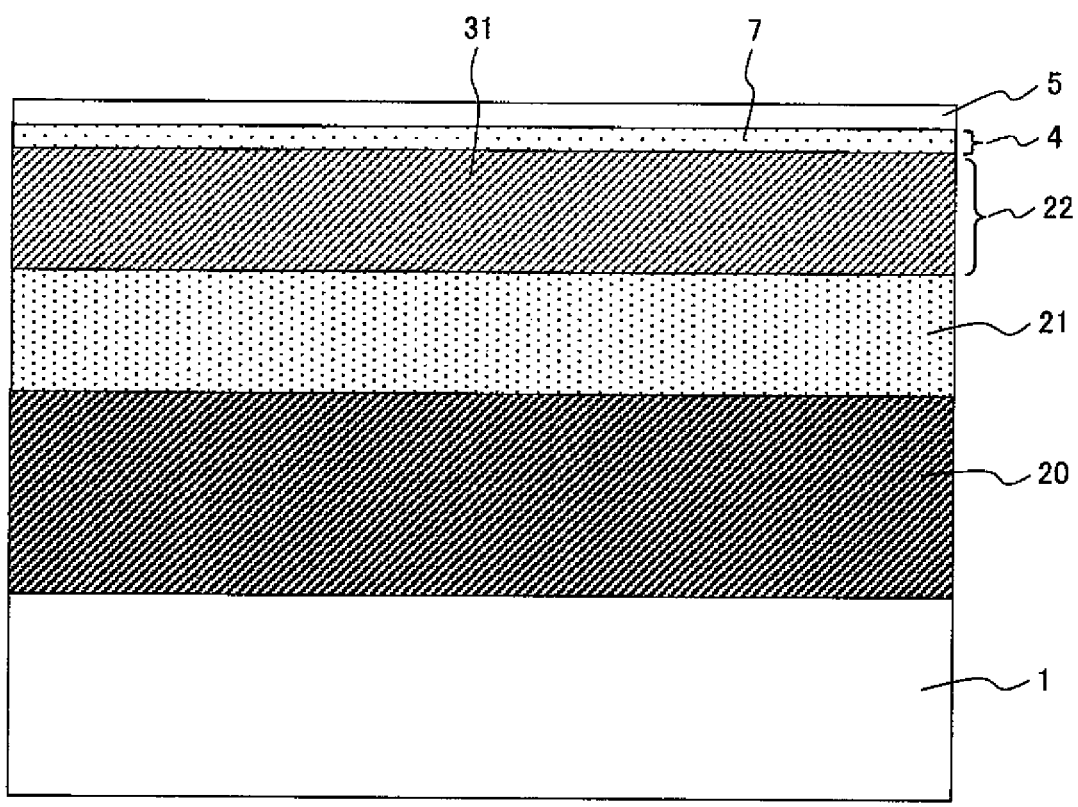
FIG. 33 is a second cross sectional view of a magnetic recording medium according to the sixth embodiment of the present invention, taken in the circumferential direction of the magnetic recording medium.

FIGS. 32 and 33 are cross sectional views each showing a magnetic recording medium according to the sixth embodiment of the present invention, taken along a circumferential direction of the magnetic recording medium.

In the fourth embodiment, data is recorded in the magnetic recording medium by the perpendicular magnetic recording. The tracks having the recording regions, which are included in the recording layer 22, are made of the magnetic material. The other regions included in the recording layer 22 are made of the non-magnetic material. The magnetic recording medium according to the fourth embodiment is a so-called discrete track medium.

In the sixth embodiment data is recorded in the magnetic recording medium by perpendicular magnetic recording. The magnetic recording medium includes a recording layer 22 having recording regions and other regions. The recording regions are made of a magnetic material. The other regions are made of a non-magnetic material. The magnetic recording medium according to the sixth embodiment is a so-called patterned medium.

The recording layer 22 included in the magnetic recording medium according to the sixth embodiment is different from the recording layer 22 included in the magnetic recording medium (shown in FIG. 27) according to the fourth embodiment. The other configurations of the magnetic recording medium according to the sixth embodiment are the same as the magnetic recording medium (shown in FIG. 27) according to the fourth embodiment. The recording layer 22 included in the magnetic recording medium according to the sixth embodiment has a cross section (taken along the line A-A' of FIG. 29 and a radial direction of the magnetic recording medium) that is the same as or similar to the cross section shown in FIG. 27. The recording layer 22 also has a cross section (taken along the circumferential direction of the magnetic recording medium and along a track having the recording regions) shown in FIG. 32. The recording regions included in each track are discretely formed in the circumferential direction of the magnetic recording medium as shown in FIG. 32. The recording layer 22 also has a cross section (taken along the circumferential direction of the magnetic recording medium and along a track not having a recording region) shown in FIG. 33. Thus, the magnetic recording medium has a so-called patterned medium structure. In this case, the recording regions included in each of the tracks are magnetically separated from the recording regions included in the other tracks. In addition, each of the recording regions, which is included in any of the tracks, is magnetically separated from another one of the recording regions, which is included in the same track. Thus, the magnetic recording medium can further reduce a magnetic effect (noise) generated by magnetization in a recording region located near a recording region into which data is to be recorded. Also, the magnetic recording medium according to the present embodiment is suitable for a high recording density.

The magnetic recording medium according to the present embodiment may have another structure. The magnetic recording medium having the other configuration has the following cross sections: a cross section (taken in the radial direction of the magnetic recording medium and along a line on which the recording regions are located) that is the same as or similar to the cross section shown in FIG. 28; the same cross section (taken along the circumferential direction of the magnetic recording medium and along a track having the recording regions) as shown in FIG. 32; and the same cross section (taken along the circumferential direction of the magnetic recording medium and along a track not having a recording region) as shown in FIG. 33. In this case, side portions of each of the tracks having the recording regions may be covered with a material having high thermal conductivity.

The magnetic recording medium according to the present embodiment may have a thermal conduction layer 4, whose structure is the same as or similar to the structure shown in FIG. 11. The thermal conduction layer 4 having the plurality of materials. The thermal conduction layer 4 includes the thin film 6 having high thermal conductivity and the thin film 7 having low thermal conductivity. The thermal conduction layer 4 is formed on the recording layer 22. The thin film 6 having high thermal conductivity is located on the recording regions included in the recording layer 22. The thin film 7 having low thermal conductivity is located on the other regions included in the recording layer 22. The recording layer 22 has a cross section (taken in the radial direction of the magnetic recording medium and along a line on which the recording regions are located) that is the same as or similar to the cross section shown in FIG. 27. In addition, the recording layer 22 has a cross section (taken along the circumferential direction of the magnetic recording medium and along a track having the recording regions) in which the recording regions are discretely formed and portions of the thin film 6 are discretely formed as shown in FIG. 27. Furthermore, the recording layer 22 has the same cross section (taken along the circumferential direction of the magnetic recording medium and along a track not having a recording region) as shown in FIG. 33. Heat is effectively transferred only to and released only from the recording regions. It is hardly likely that heat is transferred to the recording regions other than the heated recording regions due to the thin film 7. The portions of the thin film 7 are located in the respective spaces between the pairs of the portions of the thin film 6 located on the recording regions. This structure ensures thermal stability of magnetic particles included in the recording layer during magnetic recording.

The magnetic recording medium according to the present embodiment may have a structure with the following cross sections: a cross section (taken in the radial direction of the magnetic recording medium and along a line on which the recording regions are located) that is the same as or similar to the cross section shown in FIG. 28; a cross section (taken along the circumferential direction of the magnetic recording medium and along a track having the recording regions) that is the same as or similar to shown in FIG. 28; and the same cross section (taken along the circumferential direction of the magnetic recording medium and along a track that does not have a recording region and has a non-magnetic layer 31) as shown in FIG. 33. In this case, top and side surfaces of each of the recording regions are in contact with and covered with the thin film 6 having high thermal conductivity. Heat is more effectively transferred to and released from the recording regions included in the recording layer 22.

The recording layer 22 included in the magnetic recording medium according to the sixth embodiment is different from the recording layer 22 included in the magnetic recording medium (shown in FIGS. 17 to 23) according to the second embodiment.

The other configurations of the magnetic recording medium according to the sixth embodiment are the same as the magnetic recording medium (shown in FIGS. 17 to 23) according to the second embodiment. The recording layer 22 included in the magnetic recording medium according to the sixth embodiment may have a structure with the following cross sections: a cross section (taken in the radial direction of the magnetic recording medium and along a line on which the recording regions are located) that is the same as or similar to the cross section shown in FIG. 27 or 28; the same cross section (taken along the circumferential direction of the magnetic recording medium and along a track having the recording regions) as shown in FIG. 32, 27 or 28; and the same cross section (taken along the circumferential direction of the magnetic recording medium and along a track not having a recording region) as shown in FIG. 33.

The magnetic recording medium according to the present embodiment can be formed by a similar method to the formation method described in the first embodiment. The magnetic recording medium according to the present embodiment can be used in the magnetic recorder shown in FIG. 16.

As apparent from the above description, the magnetic particles that are present in the recording layer included in the magnetic recording medium (into which data is to be recorded using the thermally assisted magnetic recording) for HDD are efficiently heated and cooled for magnetic recording. The magnetic recording medium ensures thermal stability of the magnetic particles heated during magnetic recording and thermal stability of the magnetic particles located near the heated magnetic particles to suppress disappearance of data. Therefore, the present invention provides the magnetic recording medium having a high recording density and with high reliability, and provides the magnetic recorder including the magnetic recording medium.

What is claimed is:

1. A magnetic recording medium, comprising:
a substrate;
an under layer formed on the substrate;
a recording layer formed both radially and circumferentially continuously of a magnetic material on the under layer, the recording layer having tracks; and
a thermal conduction layer formed on the recording layer, the thermal conduction layer including first thin films and second thin films, the first and second thin films each being made of a plurality of materials having different thermal conductivities;
wherein the first thin films made of a material highest in thermal conductivity among the plural materials are formed on some portions of the thermal conduction layer, with the some portions being located in association with portions of the tracks included in the recording layer; and
the second thin films made of a material relatively lower in thermal conductivity than the first thin films are formed between respective pairs of the first thin films within the thermal conduction layer.

2. The magnetic recording medium according to claim 1, wherein
the first thin films are discretely formed on some portions of the thermal conduction layer, with the some portions being located in association with portions of the tracks included in the recording layer.

3. The magnetic recording medium according to claim 2, wherein each of the first and second thin films has a thickness of 1 to 10 nm.

4. The magnetic recording medium according to claim 2, wherein
the first thin film is made of a material containing copper, silver, gold, aluminum, diamond, a diamond-like carbon, or a carbon nanotube; and
the second thin film is made of a material containing a silicon oxide, a silicon nitride, a silicon oxynitride, a copper oxide, or an aluminum oxide.

5. The magnetic recording medium according to claim 2, further comprising:
an overcoat; and
a diffusion barrier layer formed in at least one of an interface region between the first and second thin films, an interface region between the thermal conduction layer and the recording layer, and an interface region between the thermal conduction layer and the overcoat.

6. The magnetic recording medium according to claim 5, wherein
the diffusion barrier layer has a thickness of 1 to 10 nm.

7. The magnetic recording medium according to claim 5, wherein
the diffusion barrier layer is made of a material containing a titanium nitride, a tantalum nitride, tungsten, or ruthenium.

8. A magnetic recorder comprising the magnetic recording medium according to claim 1.

9. A magnetic recording medium, comprising:
a substrate;
an under layer formed on the substrate;
a recording layer formed on the under layer, the recording layer having tracks; and
a thermal conduction layer formed on the recording layer, the thermal conduction layer including first thin films and second thin films, the first and second thin films each being made of a plurality of materials having different thermal conductivities;
an overcoat; and
a diffusion barrier layer formed in at least one of an interface region between the first and second thin films, an interface region between the thermal conduction layer and the recording layer, and an interface region between the thermal conduction layer and the overcoat;
wherein the first thin films are discretely formed on some portions of the thermal conduction layer, with the some portions being located in association with portions of the tracks included in the recording layer;
wherein the first thin films made of a material highest in thermal conductivity among the plural materials are formed on some portions of the thermal conduction layer, with the some portions being located in association with portions of the tracks included in the recording layer; and
wherein the second thin films made of a material relatively lower in thermal conductivity than the first thin films are formed between respective pairs of the first thin films within the thermal conduction layer.

10. The magnetic recording medium according to claim 9, wherein
the diffusion barrier layer has a thickness of 1 to 10 nm.

11. The magnetic recording medium according to claim 9, wherein
the diffusion barrier layer is made of a material containing a titanium nitride, a tantalum nitride, tungsten, or ruthenium.

* * * * *